(12) United States Patent
Milvaney et al.

(10) Patent No.: US 11,244,284 B2
(45) Date of Patent: Feb. 8, 2022

(54) DOCUMENT STATUS MANAGEMENT SYSTEM

(71) Applicant: MICROSOFT TECHNOLOGY LICENSING, LLC, Redmond, WA (US)

(72) Inventors: Douglas Lane Milvaney, Somerville, MA (US); Benjamin Gustav Wilde, Quincy, MA (US); Abigail Jane Sellen, Cambridge (GB); Nina Rhodes Williams, Kirkland, WA (US); Sian Elizabeth Lindley, Cambridge (GB); Kelsey Ann Vaughn, Kirkland, WA (US); Paul Anthony Scudieri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 15/995,046

(22) Filed: May 31, 2018

(65) Prior Publication Data
US 2019/0370749 A1 Dec. 5, 2019

(51) Int. Cl.
*G06Q 10/10* (2012.01)
*G06F 16/93* (2019.01)
*G06Q 10/06* (2012.01)
*H04L 29/06* (2006.01)

(52) U.S. Cl.
CPC .......... *G06Q 10/103* (2013.01); *G06F 16/93* (2019.01); *G06Q 10/06* (2013.01); *H04L 65/4092* (2013.01); *H04L 65/601* (2013.01)

(58) Field of Classification Search
CPC ..... G06F 16/168; G06F 16/93; G06Q 10/103; G06Q 10/06; G06Q 10/101; H04L 65/4092; H04L 65/601
See application file for complete search history.

(56) References Cited

U.S. PATENT DOCUMENTS

| | | | |
|---|---|---|---|
| 6,687,878 B1 | 2/2004 | Eintracht et al. | |
| 6,910,188 B2 | 6/2005 | Keohane et al. | |
| 7,107,307 B1 | 9/2006 | Takishita | |
| 7,140,536 B2 | 11/2006 | Barabe et al. | |

(Continued)

FOREIGN PATENT DOCUMENTS

| | | |
|---|---|---|
| EP | 2921970 A1 | 9/2015 |
| EP | 2212807 B1 | 11/2017 |

OTHER PUBLICATIONS

"Non Final Office Action Issued in U.S. Appl. No. 15/893,329", dated Mar. 17, 2020, 13 Pages.

(Continued)

*Primary Examiner* — Apu M Mofiz
*Assistant Examiner* — Sheryl L Holland
(74) *Attorney, Agent, or Firm* — NovoTechIP International PLLC

(57) ABSTRACT

A document management system and process for facilitating the state of various portions of electronic content in which users can select specific workflow stages to assign to selected content elements in the electronic content that can indicate the workflow condition of the specified content. This provides individual and group users the ability for precise, timely, and effective management of document workflow that facilitates more natural and smoother document development.

20 Claims, 16 Drawing Sheets

(56) References Cited

U.S. PATENT DOCUMENTS

| | | | |
|---|---|---|---|
| 7,568,151 | B2 | 7/2009 | Bargeron et al. |
| 7,937,663 | B2 | 5/2011 | Parker et al. |
| 7,962,853 | B2 | 6/2011 | Bedi et al. |
| 8,453,052 | B1 | 5/2013 | Newman et al. |
| 8,510,646 | B1 | 8/2013 | Young et al. |
| 8,655,950 | B2 | 2/2014 | Scherpa et al. |
| 8,893,017 | B2 | 11/2014 | Rein et al. |
| 8,965,983 | B2 | 2/2015 | Costenaro et al. |
| 9,053,079 | B2 | 6/2015 | Bailor et al. |
| 9,230,356 | B2 | 1/2016 | Chan et al. |
| 9,769,104 | B2 | 9/2017 | Appelman et al. |
| 2004/0003352 | A1 | 1/2004 | Bargeron et al. |
| 2004/0233621 | A1* | 11/2004 | Maeoka ............... G06Q 10/107 361/679.21 |
| 2006/0136510 | A1 | 6/2006 | Voronov et al. |
| 2006/0136821 | A1 | 6/2006 | Barabe et al. |
| 2006/0168510 | A1 | 7/2006 | Bryar et al. |
| 2007/0271502 | A1 | 11/2007 | Bedi et al. |
| 2009/0006936 | A1 | 1/2009 | Parker et al. |
| 2009/0249224 | A1 | 10/2009 | Davis et al. |
| 2010/0131836 | A1 | 5/2010 | Dukhon et al. |
| 2011/0161425 | A1 | 6/2011 | Xiao et al. |
| 2012/0192086 | A1 | 7/2012 | Ghods et al. |
| 2013/0073989 | A1 | 3/2013 | Harris et al. |
| 2013/0212250 | A1 | 8/2013 | Kleppner et al. |
| 2013/0254699 | A1* | 9/2013 | Bashir .................... G06Q 10/10 715/772 |
| 2014/0082525 | A1 | 3/2014 | Kass et al. |
| 2014/0136995 | A1 | 5/2014 | Matas |
| 2014/0201131 | A1* | 7/2014 | Burman ................. G06F 40/10 707/608 |
| 2014/0229880 | A1 | 8/2014 | Aradhye et al. |
| 2014/0243097 | A1 | 8/2014 | Yong et al. |
| 2014/0281870 | A1 | 9/2014 | Vogel et al. |
| 2014/0289645 | A1 | 9/2014 | Megiddo et al. |
| 2014/0298207 | A1 | 10/2014 | Ittah et al. |
| 2014/0365579 | A1 | 12/2014 | Thrasybule et al. |
| 2014/0365886 | A1 | 12/2014 | Koenig et al. |
| 2015/0081674 | A1 | 3/2015 | Ali et al. |
| 2015/0163187 | A1 | 6/2015 | Nasir et al. |
| 2015/0215243 | A1 | 7/2015 | Xu et al. |
| 2015/0242091 | A1 | 8/2015 | Lu et al. |
| 2015/0261411 | A1 | 9/2015 | Snook et al. |
| 2015/0339282 | A1 | 11/2015 | Goyal |
| 2015/0378974 | A1 | 12/2015 | Massand |
| 2016/0063840 | A1 | 3/2016 | Kumarasamy mani et al. |
| 2016/0173629 | A1 | 6/2016 | Kleppner et al. |
| 2016/0196247 | A1 | 7/2016 | Lee et al. |
| 2016/0301701 | A1 | 10/2016 | Snyder |
| 2016/0321227 | A1 | 11/2016 | Keslin et al. |
| 2016/0378734 | A1 | 12/2016 | Mullins et al. |
| 2017/0003835 | A1 | 1/2017 | Shaffer et al. |
| 2017/0048285 | A1* | 2/2017 | Pearl ....................... G06F 16/11 |
| 2017/0076101 | A1* | 3/2017 | Kochhar ............. G06F 21/6209 |
| 2017/0177182 | A1 | 6/2017 | Wong et al. |
| 2017/0285896 | A1 | 10/2017 | Chandra et al. |
| 2018/0109639 | A1 | 4/2018 | Skillman et al. |
| 2018/0123815 | A1 | 5/2018 | Milvaney et al. |
| 2018/0276189 | A1 | 9/2018 | Bache et al. |
| 2019/0250780 | A1 | 8/2019 | Feng et al. |

OTHER PUBLICATIONS

"Collaboration", Retrieved From: https://www.zoho.com/writer/help/document-collaboration.html#Lock_Content, Retrieved on: Apr. 24, 2018, 11 Pages.

Goldsmith, Steve, "Introducing Stride", Retrieved From: https://www.atlassian.com/blog/announcements/introducing-stride, Sep. 7, 2017, 9 Pages.

"Non Final Office Action Issued in U.S. Appl. No. 15/582,598", dated Feb. 8, 2019, 30 Pages.

"Final Office Action Issued in U.S. Appl. No. 15/893,329", dated Nov. 1, 2019, 10 Pages.

"Document Sharing and Collaboration", Retrieved From: https://www.zoho.com/docs/help/document-sharing-collaboration.html#configure-notification, Retrieved Date: Sep. 7, 2015, 5 Pages.

"Track and Review Changes", Retrieved From: https://helpx.adobe.com/indesign/using/tracking-reviewing-changes.html, Retrieved Date: Feb. 10, 2017, 8 Pages.

"Track Changes and Comments", Retrieved From: http://www.gcflearnfree.org/excel2013/track-changes-and-comments/1/, Retrieved Date: Feb. 10, 2017, 21 Pages.

"Track Changes in Word", Retrieved From: https://support.office.com/en-gb/article/Track-changes-in-Nord-197ba630-0f5f-4a8e-9a77-3712475e806a, Retrieved Date: Feb. 10, 2017, 2 Pages.

"Final Office Action Issued in U.S. Appl. No. 14/977,168", dated Aug. 16, 2018, 25 Pages.

"Non Final Office Action Issued in U.S. Appl. No. 14/977,168", dated Mar. 1, 2018, 18 Pages.

Brush, et al., "Notification for Shared Annotation of Digital Documents", In Proceedings of the SIGCHI Conference on Human Factors in Computing Systems, Apr. 20, 2002, pp. 89-96.

Leland, et al., "Collaborative Document Production Using Quilt", In Proceedings of the ACM Conference on Computer-Supported Cooperative Work, Sep. 26, 1988, pp. 206-215.

"International Search Report and Written Opinion Issued in PCT Application No. PCT/US2016/066424", dated Feb. 7, 2017, 11 Pages.

"International Search Report and Written Opinion Issued in PCT Application No. PCT/US2018/026639", dated Jul. 10, 2018, 12 Pages.

Shen, et al., "Flexible Notification for Collaborative Systems", In Proceedings of the ACM Conference on Computer Supported Cooperative Work, Nov. 16, 2002, pp. 77-86.

Weng, et al., "Asynchronous Collaborative Writing Through Annotations", In Proceedings of the ACM Conference on Computer Supported Cooperative Work, Nov. 6, 2004, pp. 578-581.

"International Search Report and Written Opinion Issued in PCT Application No. PCT/US2019/032550", dated Jun. 28, 2019, 13 Pages.

"Non Final Office Action Issued in U.S. Appl. No. 15/893,329", dated Apr. 4, 2019, 9 Pages.

"Final Office Action Issued in U.S. Appl. No. 15/893,329", dated Jul. 27, 2020, 14 Pages.

\* cited by examiner

DOCUMENT STATUS MANAGEMENT SYSTEM

BACKGROUND

Electronic documents typically contain digital content such as text, images, and spreadsheets. During the drafting of a document, the content can be significantly revised over a period of time by multiple people. Some document-editing applications—such as certain word processors—track revisions made to the document by different users, storing them in the file that constitutes the document. This metadata can then be displayed through a redlining mechanism, in which underlining formatting is used to present newly added content, and struck-through formatting identifies deleted content.

It is common for a collaborative authoring and review process to be used in the development and review of word processing documents. Collaborative document management processes are facilitated by the presence of communication networks to bring a wide variety of participants together to accomplish common goals. For example, many documents generated in today's electronic society are created by one or more individuals, and then further subject to review by several others. The documents to be reviewed are created as a form of electronic content that is forwarded to others for review and revision, perhaps via an electronic network.

Authors and reviewers participating in this shared process typically insert markups and comments, and sometimes changes, to an individualized version of the document, with each version having its own comments, markups, and other annotations. In such cases, the document creator or manager must then sort through each of the document copies and consolidate the comments (and/or changes) into a single edited copy. Some comments and changes may be the same across the versions, but the manager of the document will still need to sort through the various feedback to produce a final draft.

Furthermore, in the case of multiple authors, the ability to readily ascertain or track the status of individual pieces of content in the document can be time-consuming. Thus, there remain significant areas for new and improved ideas for the efficient development of documents, as well as the management of a team of authors and/or reviewers collaborating on a single document.

SUMMARY

A system for tagging of specific content in electronic content associated with an application, in accord with a first aspect of this disclosure, includes one or more processors and one or more non-transitory computer readable media including instructions which, when executed by the one or more processors, cause the one or more processors to determine, during use of the application, that a first triggering event has occurred for a first content element, the first content element including a portion of the electronic content. The instructions further cause the one or more processors to, in response to the determination that the first triggering event has occurred, cause the application to present a first user interface element including a plurality of workflow stage options, the plurality of workflow stage options including a first workflow stage, and to receive a first user input indicating a selection of the first workflow stage. In addition, the instructions also cause the one or more processors to, in response to receiving the first user input, record an association between the first workflow stage and the first content element, determine that the first workflow stage is associated with the first content element, and display a first indicator corresponding to the first workflow stage when information regarding the first content element is being accessed in response to the determination that the first workflow stage is associated with the first content element.

A method executed on one or more computing devices to tag specific content in electronic content associated with an application, in accord with a second aspect of this disclosure, includes determining, during use of the application, that a first triggering event has occurred for a first content element, the first content element including a portion of the electronic content. The method also includes, in response to the determination that the first triggering event has occurred, causing the application to present a first user interface element including a plurality of workflow stage options, the plurality of workflow stage options including a first workflow stage. In addition, the method involves receiving a first user input indicating a selection of the first workflow stage and, in response to receiving the first user input, recording an association between the first workflow stage and the first content element, determining that the first workflow stage is associated with the first content element. Furthermore, the method includes displaying a first indicator corresponding to the first workflow stage when information regarding the first content element is being accessed in response to the determination that the first workflow stage is associated with the first content element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
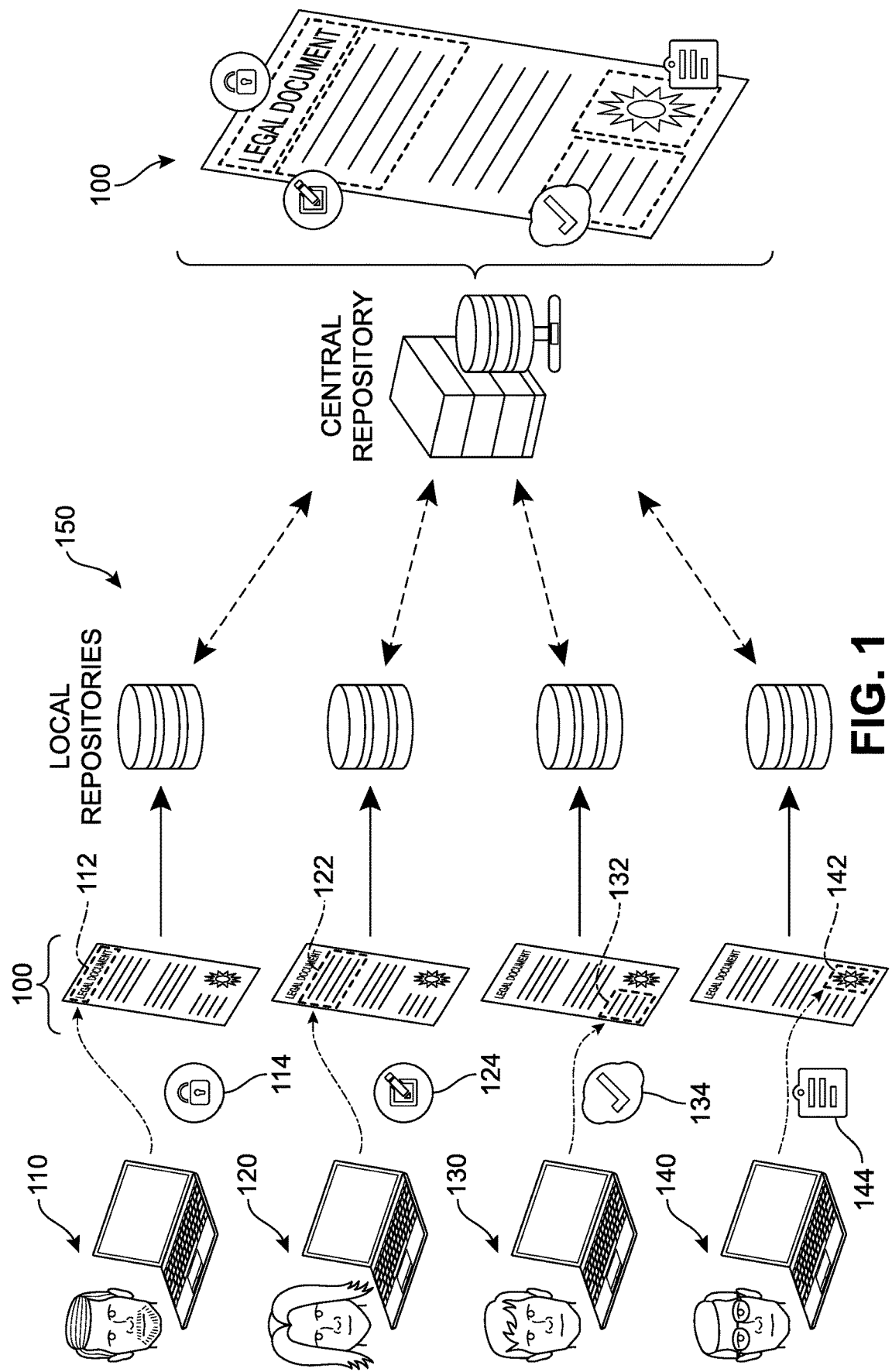
FIG. 1 is a conceptual diagram illustrating a collaborative document processing environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As introduced above, applications such as word processors, publishers, spreadsheets, presentations, and others can be used to generate electronic documents or content. For purposes of this description, the term "electronic content" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include word or other text-based documents.

The electronic content can be understood to include or be segmented into one or more portions that will be referred to as content elements. Thus, a "content element" in this description includes any part of electronic content that is defined or discernable as a part. For example, a content element may be automatically discerned from a characteristic of the content element itself (e.g., a letter, number, word, sentence, paragraph, section, image, symbol, or chapter of an electronic document, or other file format designation) or may be manually defined by a reviewer (e.g., a reviewer-selected collection of words in an electronic document, a reviewer-selected portion of a digital image, a reviewer-selected slide from a presentation). Examples of content elements include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

In addition, an end-user for purposes of this application is one who creates, authors, views, develops, manages, reviews, revises, or deletes pieces of electronic content, including the creation or updating of comments associated with the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, Powerpoint®, Excel®) and other applications provide commenting and annotating tools. For example, Microsoft Word® offers users tools such as Comments, Highlight, Underline and other formatting options, Track Changes, Compare, among others, to add comments or make changes to a document. In other applications such as Google Docs® a "Suggestion Mode" may be used to suggest modifications or provide feedback for a document. These are non-limiting examples, and any other electronic content editing or collaboration application may benefit from the disclosed implementations.

Once a comment is added, the document as viewed by other reviewers may present the information included in the comments if desired. Such tools can be used to facilitate collaborative workflows. For purposes of this description, data or documents being developed collaboratively include any activity in which multiple machines operate together autonomously, or as directed by humans, to process information, including electronic content. Processing the information may include the activities of acquiring the information, augmenting the information (e.g., via the addition of meta-data, such as comments), sorting the information, changing the information, deleting the information, rendering the information, aggregating the information from multiple sources, transforming the information from one form to another, and deriving new information from previously-existing information. One example of a collaborative process is the cooperation of multiple reviewers to view, comment on, and make changes to a document as part of a shared review activity.

In scenarios where multiple authors and/or reviewers are collaborating to produce a document, various parts of the document may be authored and/or revised at different times or during different stages of document development. For example, a first content element of the document may be finalized, a second content element of the same document may be in the midst of revisions, and a third content element within the same document may be in an initial drafting stage. In addition, single authors involved in the development of larger documents may also struggle to maintain a comprehensive log identifying the respective workflow stages of various sections of the document. In some cases, authors may insert ad hoc notes or tags that must be carefully removed or manually checked and edited before release of the document, reducing efficiency of the process.

Furthermore, in situations where multiple authors are collaborating on a shared document, one author or reviewer may wish to work privately and choose to lock or restrict access to the whole document, in order to work on a single section or content element. In some cases, a document may be locked by one reviewer for periods of time in which other end-users had intended to contribute to its development and/or the document may remain locked unintentionally if the reviewer neglects to unlock the document and is out of communication or otherwise unreachable for a period of time. The remaining end-users may be unable to access the live document during such periods. For purposes of this description, a live document refers to a document that is available for simultaneous development by multiple users and/or across multiple locations in real-time. In some cases, authors will work on their respective sections from local document copies that must later be merged or manually added to the live document, often resulting in errors or disorganization of content material.

In such cases, the 'big picture' progress or workflow of a document or file may be obscured as users attempt to communicate the workflow stage or status of each content element or make changes without notification to or permission of others. Individuals or end-users often work on electronic content at different rates and will produce various content elements across different levels or stages of completeness. In addition, ad hoc document organization maneuvers and communications can be time-consuming and result in duplicative or wasted effort, reducing the effectiveness of the collaborative document generation process.

Thus, there remains need for a document management system and process in which multiple authors may access a specific piece of document content and receive real-time updates as to the workflow status or stage of that specific content. With the system and process presented herein, users can more readily identify, tag, filter, sort, access, edit, communicate, and share ideas across multiple content elements. Furthermore, the ability of sole authors to keep track of or monitor the stages of various sections of their own documents can often result in makeshift or ad hoc solutions that increase manual overhead. As will be described below, the proposed system provides both individual and group users the ability to more precisely communicate or specify the level of completeness of different pieces of content, and help set expectations for their colleagues, reviewers, coauthors, or other collaborators. This process can improve the management of electronic documents and facilitate a more natural and effective workflow.

Figure 10:
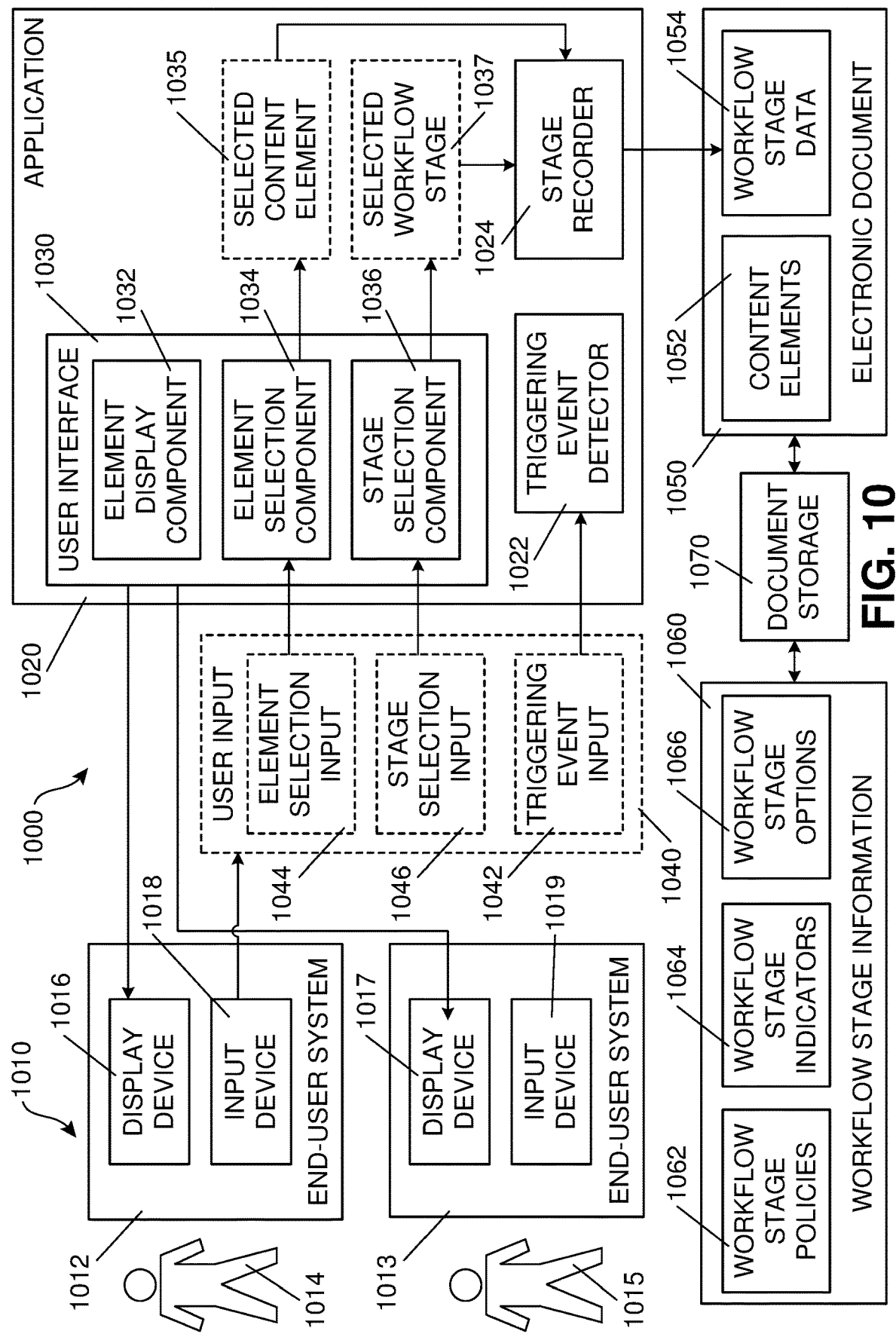
FIG. 10 is a conceptual diagram illustrating a distributed computing environment for tagging specific content.

In order to better introduce the systems and methods to the reader, FIG. 1 presents an example of a representative collaborative document processing environment ("environment") 150 for implementing a content element management system (illustrated schematically in FIG. 10). In different implementations, the environment can include a plurality of computing device end-users, or simply "users". For example, a first user 110, a second user 120, a third user 130, and a fourth user 140 are shown in FIG. 1. One or more users can interact with or manipulate data presented via a user device. In this case, each user is accessing a document 100 on separate devices. As the users collaborate on a live document, various pieces or segments of the document may be modified or otherwise accessed at various times and across various devices. In one implementation, multiple users can access the same document at the same time and make changes that are presented in real-time to other users. Thus, workflow occurs via multiple 'streams' that are configured to push data and pull data from a central repository or cloud network.

In this example, the first user 110 has locked access to a first portion 112 of the document 100, as symbolized by a lock icon 114. While the first portion 112 is locked, the other users may not be able to modify and/or view the first portion 112. The second user 120 is modifying a second portion 122 of the document 100, as symbolized by a drafting icon 124. In addition, the third user 130 is finalizing a third portion 132 of the document 100, as symbolized by a finalizing icon 134, and the fourth user 140 is reviewing a fourth portion 142 of the document 100, as symbolized by a review icon 144. As will be described in further detail below, in different implementations, one or more users can be provided an opportunity to insert, add, attach, pair, tag, link, record, and/or associate a workflow stage to one or more content elements. The term workflow stage may also be referred to more simply as "stage". In some implementations, a stage can confer or be associated with particular policy settings that apply only to the selected content element(s). For example, in FIG. 1, the first user 110 has tagged the first portion 112 with a workflow stage that locks or restricts access to the first portion 112 by other users. In this case, the first user 110 can continue to work privately while access to the remaining portions of the document is maintained for other users. Additional details regarding the process of assigning 'stage tags' to content elements will be presented now with reference to FIGS. 2-4.

Figure 2:
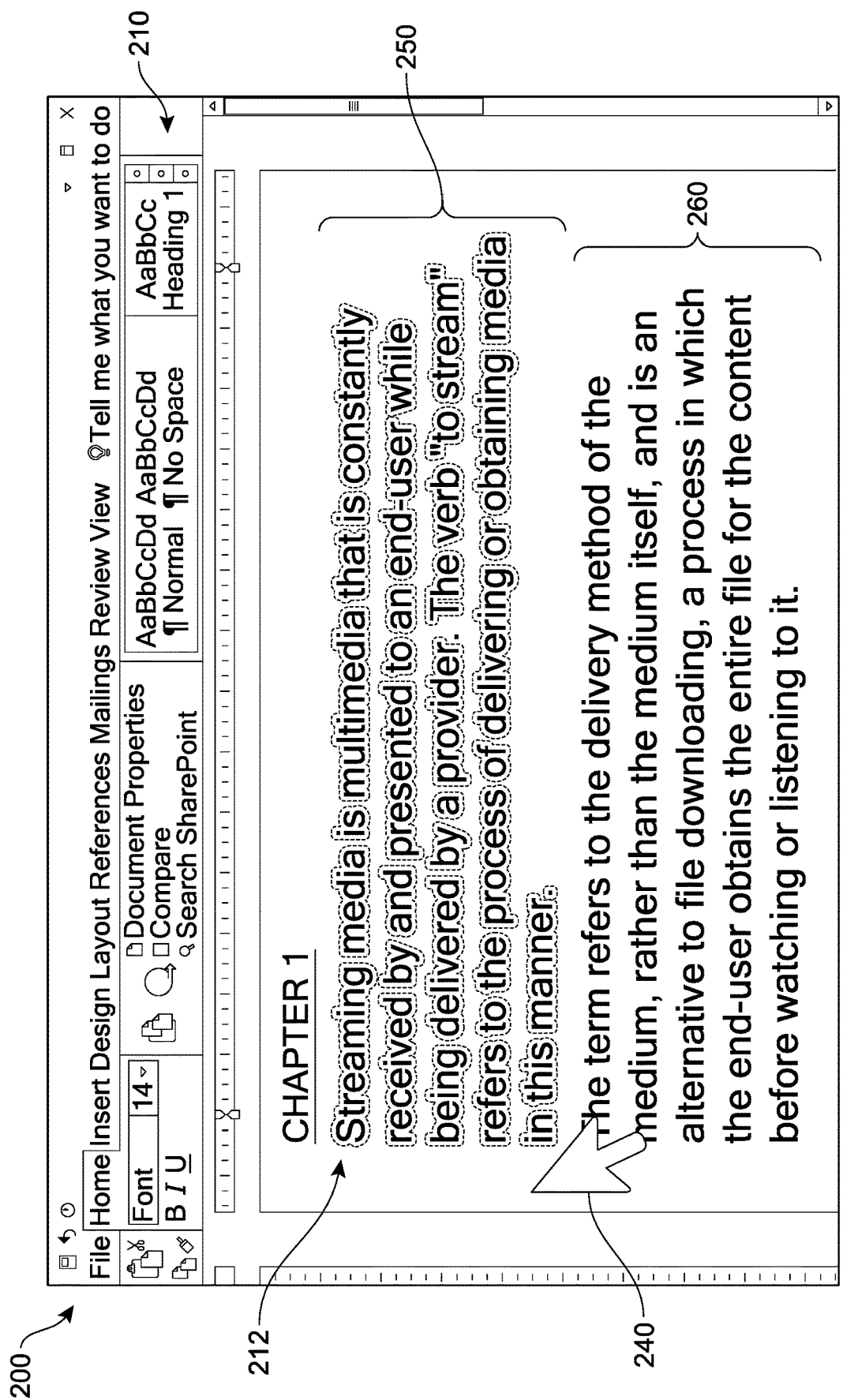
FIG. 2 is a display diagram illustrating an implementation of a word processor document with an example of a content element selection.
Figure 3:
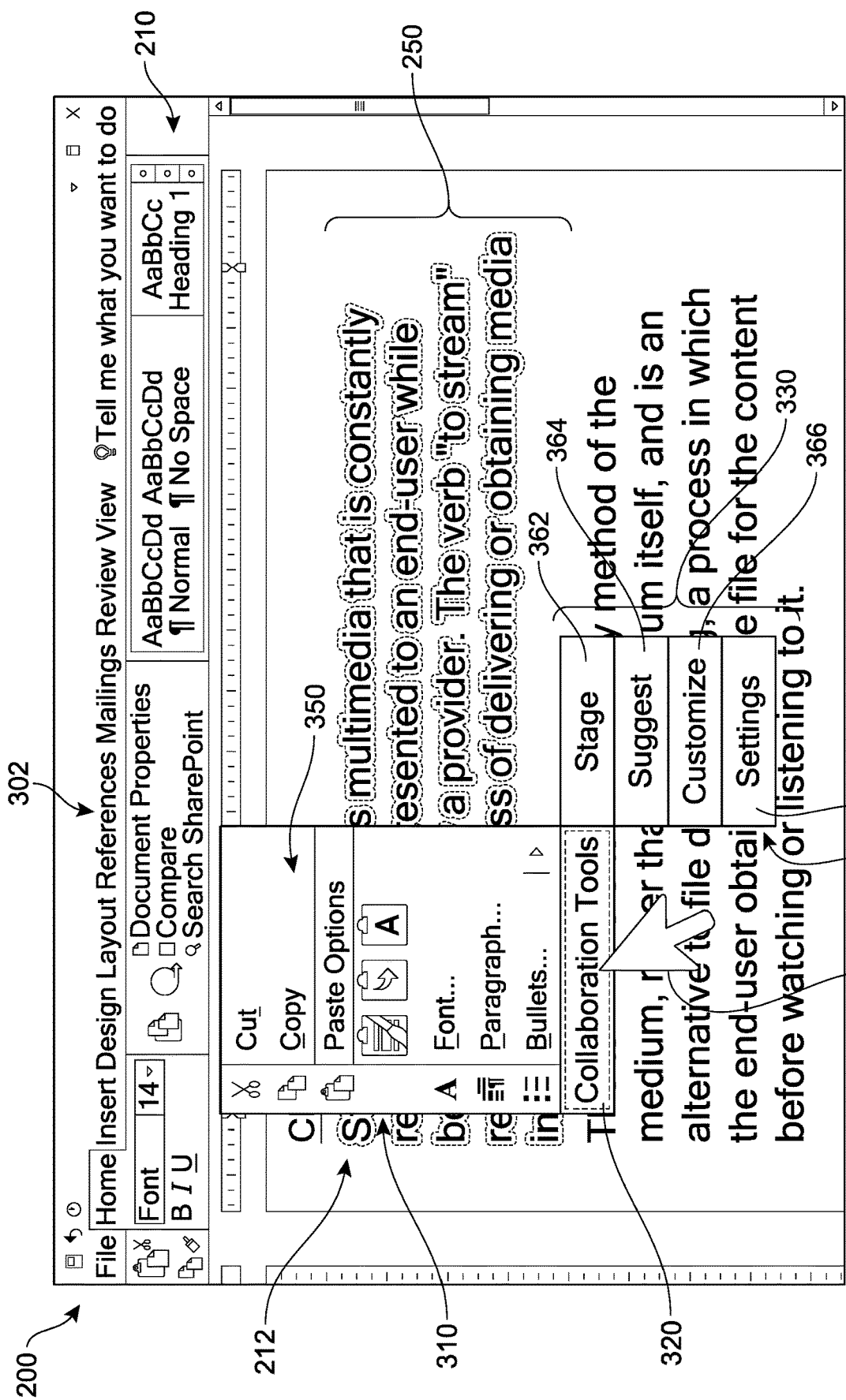
FIG. 3 is a display diagram illustrating an implementation of the word processor with a first menu and a first submenu presented in response to a trigger generated by the text selection.
Figure 4:
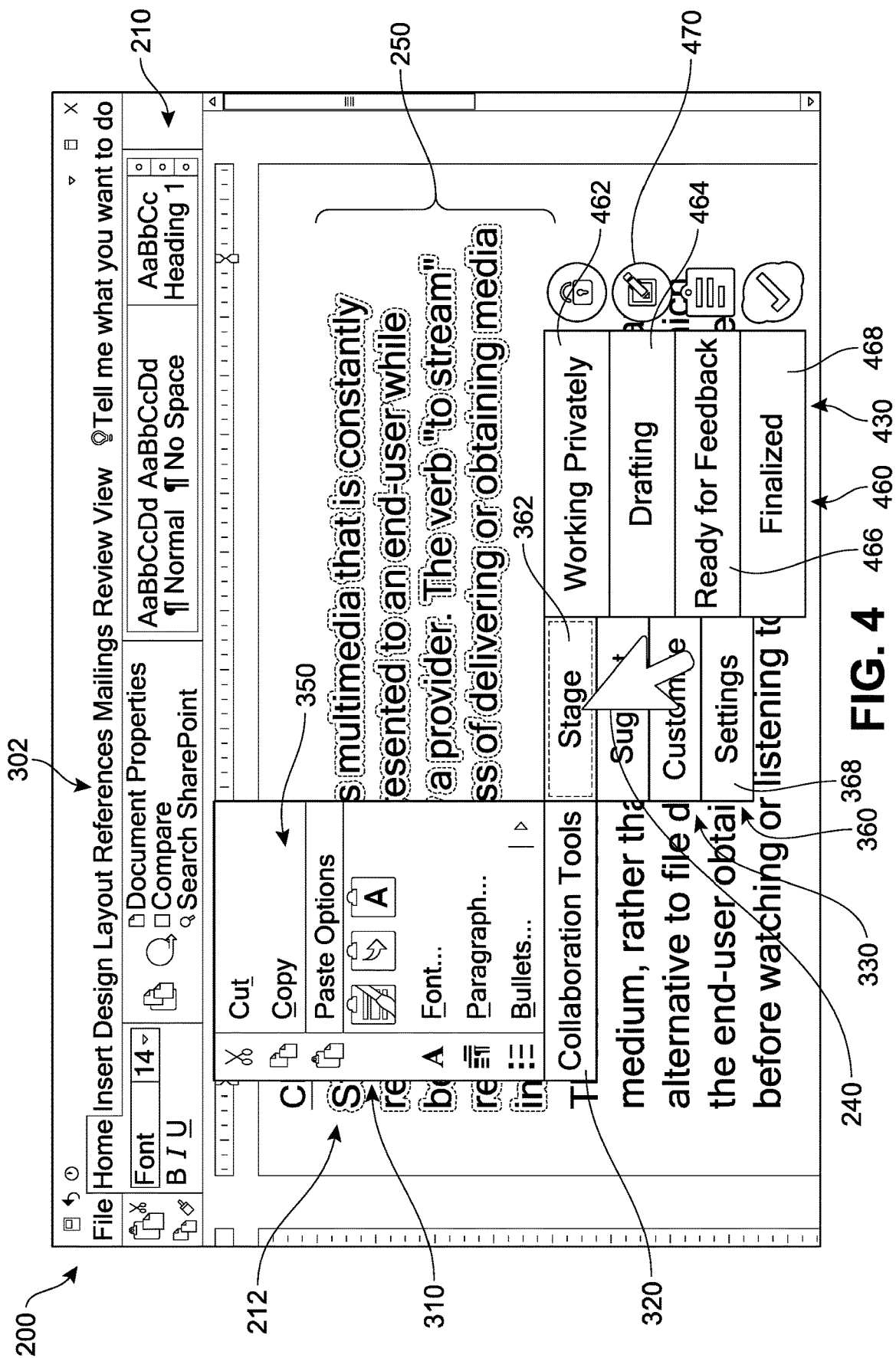
FIG. 4 is a display diagram illustrating an implementation of the word processor with a second submenu.

In FIGS. 2-4, an implementation of a display 200 for a computing device is illustrated. In different implementations, the display 200 may present various icons or graphical representation, interfaces, applications, or other device status information. As an example, the display 200 includes a first application 210. For purposes of simplicity, the first application 210 in FIG. 2 is a word processor program displaying a document page ("document") 212. In one implementation, the first application 210 may be understood to represent a version of Microsoft Word®, or another word processing program, such as Apple Pages®, Corel WordPerfect®, Google Docs®, IBM Lotus Word Pro® and other word editing programs. However, in other implementations, the first application 210 may include any other software applications within the Microsoft Office Suite® or array of Microsoft® products as well as any non-Microsoft® based applications.

During various user interactions with the first application 210, the first application 210—either as originally installed or updated—may offer the user an opportunity to tag portions of the document 212, such as content elements, with one or more workflow stage identifiers. These can typically include substantially succinct labels or tags (generally under 5 words, or graphical representations that directly indicate the stage), though in other implementations, the stage tag may be longer or more descriptive, particularly if a user elects to customize the system. In some implementations, the opportunity may be displayed or otherwise provided to the user in response to a triggering event. Referring first to FIG. 2, it may be understood that a user has navigated to a portion of text of the document 212 and selected a first content element ("first content") 250 using any type of input, such as mouse clicks, keyboard strokes, touch screen interactions, and other command inputs. The input means is symbolized here for purposes of simplicity as a cursor 240.

It should be understood that the first content 250 can refer to any portion of a document. For example, in a word processor document including multiple sections or pages of text or other data, the selected content may include a word, a sentence, a chapter, an image, or the document in its entirety. In this case, the first content 250 includes the first paragraph of a chapter ("CHAPTER 1"). It can be seen that there is additional content 260 below that remains unselected and outside of the designated first content 250.

Referring next to FIG. 3, when a user selects the first content 250, hovers over the selected first content 250, clicks on the selected first content 250, or otherwise indicates a desire to view tools and tasks associated with the selected first content 250, the system may interpret the action as a triggering event. In this case, in response to the triggering event, the first application 210 displays a native control in the form of a first menu 310, listing a plurality of options that may be related to the user's specific selected content or the fact that any content has been selected.

For purposes of this description, a "native control" refers to a mechanism for communicating content through a client application to an application user. For example, native controls may include pop-up windows that may be presented to a user via native application user interfaces (UIs), interactive buttons or other objects that may be shown to a user through native application UIs, as well as mechanisms that are native to a particular application for presenting associated content with those native controls. Furthermore, a "trigger event" or "triggering event" refers to an event (or specific sequence of events) associated with a particular use of an application, which is then used to trigger the display of a native control in a native application. In FIG. 3, the triggering event may be understood to include a 'click' or other input actions (such as a mouse left-button or right-button click, a touchscreen tap, a selection of data, or other input types). However, in other implementations, a triggering event may occur in response to results from automated intelligent scans or searches of the document and its various content elements by the system. For example, the application can be configured to automatically search the electronic content periodically, substantially continuously, or at intervals determined by an end-user, and identify when a content element should be assigned a specific workflow stage. Thus, in some implementations, a triggering event may occur without input or interaction of an end-user.

In the example of FIG. 3, the native control is presented as a graphical UI (GUI). While the GUI presented is shown as a floating drop-down menu here, in other implementations, the native control can include any other type of user interface such as a pop-up window, a dialog box or window, a window extending from a main menu 302, or other application communication or presentation means. Furthermore, in FIG. 3, the first menu 310 is overlaid on the first application's main interface. The specific location of the first menu 310 represented in FIG. 3 is intended to underscore the relationship of the message of the first menu 310 with the first content 250. However, it should be understood that in other implementations, the first menu 310 may be displayed or generated anywhere else on the screen(s) associated with the client's system, including spaced apart from, adjacent to, or around the first application 210.

In the specific example shown in FIG. 3, the first menu 310 includes a series or plurality of menu options ("options") 350. In some implementations, the first menu 310 can include one or more options normally provided when the triggering event is registered by the system, regardless of whether a content element selection has been made, such as "Cut", "Copy", "Paste", and other such options, though in other implementations, only options related to the specific content element selection may be provided. In FIG. 3, it can be seen that the menu includes a content option 320 that is labeled "Collaboration Tools". It should be understood that in different implementations, the content option 320 can be labeled or identified by any other type of alphanumeric text or symbols. In other implementations, any other alphanumeric text or graphics may be displayed in conjunction with the selection.

When a user selects the content option 320, hovers over the content option 320, clicks on the content option 320, or otherwise indicates a desire to view tools and tasks associated with the content option 320, the system may interpret the action as a triggering event. In this case, in response to the triggering event, the first application 210 displays a native control in the form of a first submenu 330, listing a plurality of content sub-options ("content sub-options") 360 associated with the content option 320.

It should be understood that in other implementations the first menu 310 may not be presented, and selection of the first content 250 may instead result in a direct presentation of the first submenu 330. Furthermore, the options and sub-options shown in the figures are for illustrative purposes only, and in different implementations, the types and labels of options can vary. In this example, the content sub-options 360 include a first sub-option 362 ("Stage"), a second sub-option 364 ("Suggest"), a third sub-option 366 ("Customize"), and a fourth sub-option 368 ("Settings"). In other implementations, there may be fewer or greater number of sub-options, and/or the sub-options made available may differ from those shown here. In other implementations, any other alphanumeric text or graphics may be displayed in conjunction with the selection.

In different implementations, each option type can be associated with a variety of actions. For example, the Stage option may direct users to another menu or options (see FIG. 4) where a workflow stage indicator may be assigned to a content element. In addition, the Suggest option can be configured to provide users with a mechanism for adding comments, notes, ideas, or other information and associating this information with the content element so that the suggestion is available and/or displayed with the content element when the content element is viewed (see FIGS. 11 and 12). The Customize option can allow users to add or modify the available options or policies, add or delete stages, modify current stage indicators, change the default menu or directory of stages, as well as select or upload different graphical icons to represent the specific stages. Similarly, the Settings option may offer users the opportunity to adjust the display, content, format, communication, access, and other settings associated with the collaboration tools. It should be understood that a Settings option may be made available on all of the menus described herein, whether or not explicitly identified.

Furthermore, in different implementations, any of the menus or native controls and options described herein can also include or be associated with an optional tool overview or Help tool. Such options can be configured to provide an introduction or summary of the offered feature(s) or tool(s), including but not limited to presentation of a teaching guide, FAQs, search for help topics, images, schematics, tutorial overviews, screenshots, photos, slideshow, video, audio, and other such content or guidance.

In FIG. 4, it can be seen that the first sub-option 362 identified as "Stage" (referring to a document's workflow stage) has been selected. In different implementations, the workflow stage of a content element can be assigned by a user. However, it should be understood that in other implementations, the system can be configured such that one or more workflow stages are automatically assigned to and/or updated for various content elements. In other words, in some implementations, the application itself (rather than an end-user) can be configured to run automated scans or searches of a document. Upon detection of specified occurrences or conditions associated with any content elements, the system can automatically determine an appropriate workflow stage for a content element and add a tag to the content element.

In some implementations, the system can determine when various portions of electronic content fall within a specific classification and assign or suggest appropriate labels. As one non-limiting example, a machine learning algorithm can be implemented that automatically detects whether certain content elements (such as a paragraph) are written to a certain degree or threshold of accuracy, quality, length, or other factors and, in response, automatically set the workflow stage to 'Final' (or another stage tag) for those content elements. As another example, an application may automatically detect that a content element should be edited or modified, and automatically set the workflow stage to 'Needs Review.' In other cases, an application may detect comments or suggested edits or revisions to a content element and automatically associate a workflow stage "Gathering Feedback" with that content element. In addition, in some implementations, an application may present, suggest, or propose one or more workflow stages that should be applied across one or more content elements and offer the user an opportunity to confirm or select one of the proposed stages to be associated with the content element(s).

Furthermore, some implementations can include provisions for presenting a summary or listing of various workflow stages associated with some or all of the content elements in document either outside of the document or while navigating within the document. For example, the summary of stages can be presented in a sidebar, canvas, or elsewhere along the display adjacent to the document, can be available in a separate window that is updated in real-time that is separate from the application, and/or can be emailed in a daily digest (or other frequency, such as weekly, monthly, or when certain pre-specified changes are made in the status of one or more content elements). In some cases, the summary can identify how many content elements are in a particular stage. In one implementation, each of the workflow stage indicators listed in the summary can be associated with a link that allows a user to navigate directly to the content element associated with the indicator. Thus, in some implementations, a workflow stage indicator itself can be used to trigger the display of the corresponding content element. As one example, an application may be configured to automatically present a summary of workflow statuses associated with some or all of content elements in a document, regardless of whether the listed content element(s) are being accessed, modified, or displayed. In one implementation, an end-user may access a menu option in the application that triggers a display of such a summary, while in other implementations, such a presentation may occur when the document is opened or when a workflow stage is modified or added by any of the user(s) of a document. In addition, in different implementations, an application can be configured to transmit or display reminders for tasks that are specific to the workflow stage selected or tagged to a content element. For example, the application may present a dialog box or generate an email or other communication to a user reminding the user to review a content element that is associated with a "Waiting for Review" indicator.

In addition, as noted above, a content element's stage and/or its associated policy settings may be modified, removed, updated, or customized. In some implementations, a content element can be associated with multiple stage indicators that can be added by a single user or by different users, or automatically assigned by the system. In one implementation, a user may also select or add a specific degree, level, or intensity for the specified stage on a scale that correlates directly with the user's progress or status with respect to the selected content. For example, in cases where the user selects "Drafting", an additional native control can be provided by which a user may input an estimated progress percentage, slide a status bar toward a particular progress level or stage that more precisely reflects the current stage of the content element, and/or estimate a time of completion of the selected stage. This additional information can then be associated with the content element's stage and presented in conjunction with the stage when desired.

In different implementations, when a user selects one of the workflow stage classifications, the system may receive the input and associate the selected stage with the selected content element. The association can be recorded (locally on a computing device and/or in the cloud) and can be accessed or communicated whenever the first content element is accessed or content elements in the specified stage are searched for.

It should be understood that in other implementations the first submenu 330 may not be presented, and selection of the first content 250 may instead result in a direct presentation of the second submenu 430. In other words, the user may be presented with the stage sub-options immediately following the triggering event. In this example, the stage sub-options 460 include a fifth sub-option 462 ("Working Privately"), a sixth sub-option 464 ("Drafting"), a seventh sub-option 466 ("Ready for Feedback"), and an eighth sub-option 468 ("Finalized"). In other implementations, there may be fewer or greater number of sub-options, and/or the sub-options made available may differ from those shown here. In other implementations, any other alphanumeric text or graphics may be displayed in conjunction with the selection.

In some implementations, as shown in FIG. 4, each stage sub-option can be displayed with an icon that can permit a user to quickly identify the stage. In one implementation, stage sub-options may be offered that were previously custom-inputted or added by a user. Such customization or personalization can facilitate the fine-tuning of document workflow management for different types of documents or workflows. As one non-limiting example, a user may have previously accessed the Settings option for the Collaboration Tools, and manually entered a workflow stage for tagging to a content element, such as a stage labeled as "Checking Sources" or "Brainstorming" or "On Hold" or "Inserting Citations" or other such customized workflow stages, which can be presented as one of the stage sub-options in the second submenu 430.

Furthermore, one or more workflow stages can also be associated with custom policy settings, and/or default policy settings. In some other implementations, the system may have available alternative stage tags that can be added, swapped, or removed from the second submenu 430 for a personalized presentation of stage options that is more directly applicable to the needs of a user. In some implementations, stage sub-options manually entered by a user can be added to a directory of sub-options that can be stored or retained in local or cloud storage, and can be offered as potential stage choices during later workflows.

Figure 5:
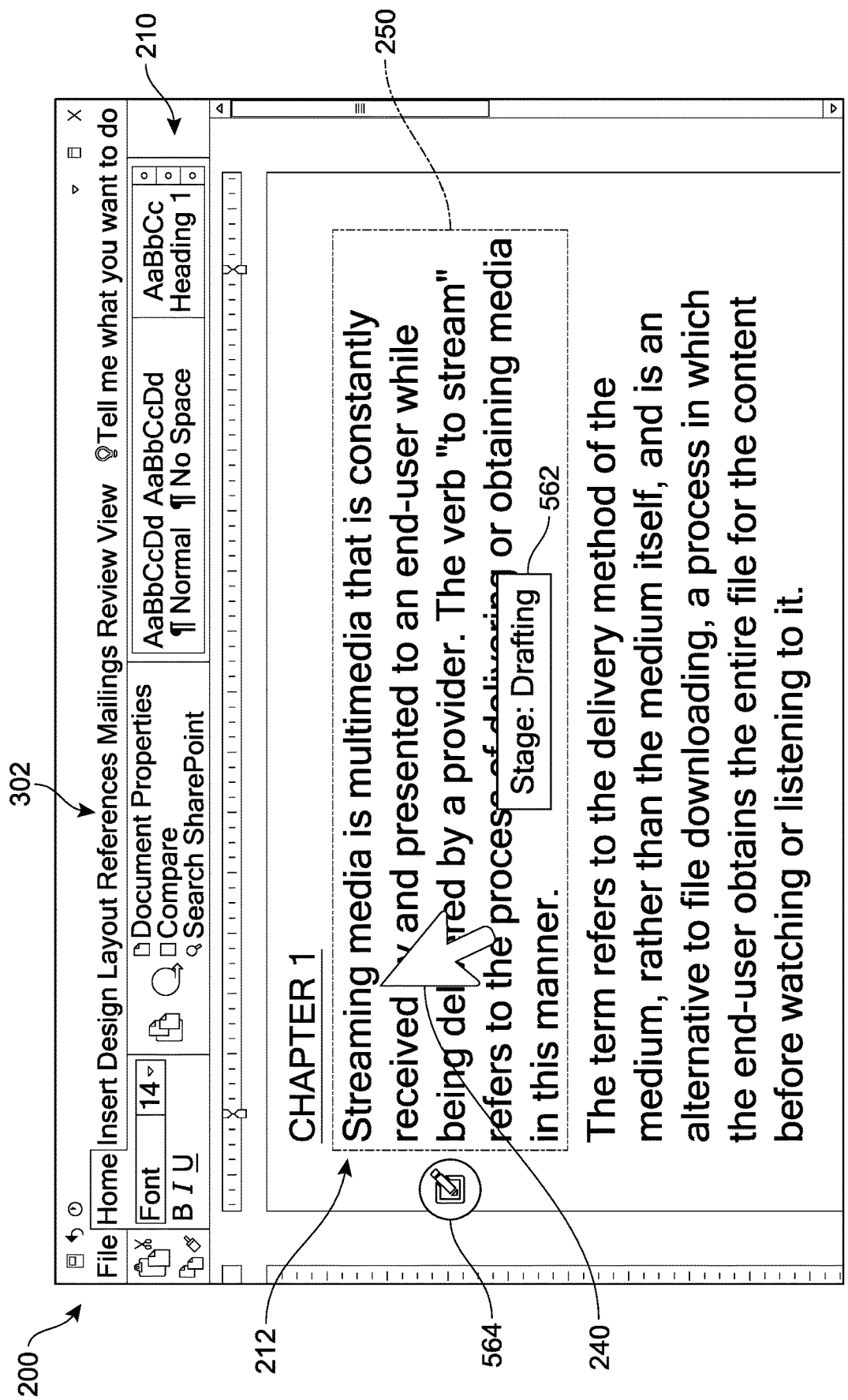
FIG. 5 is a display diagram illustrating an implementation of the word processor with a first stage indicator.
Figure 6:
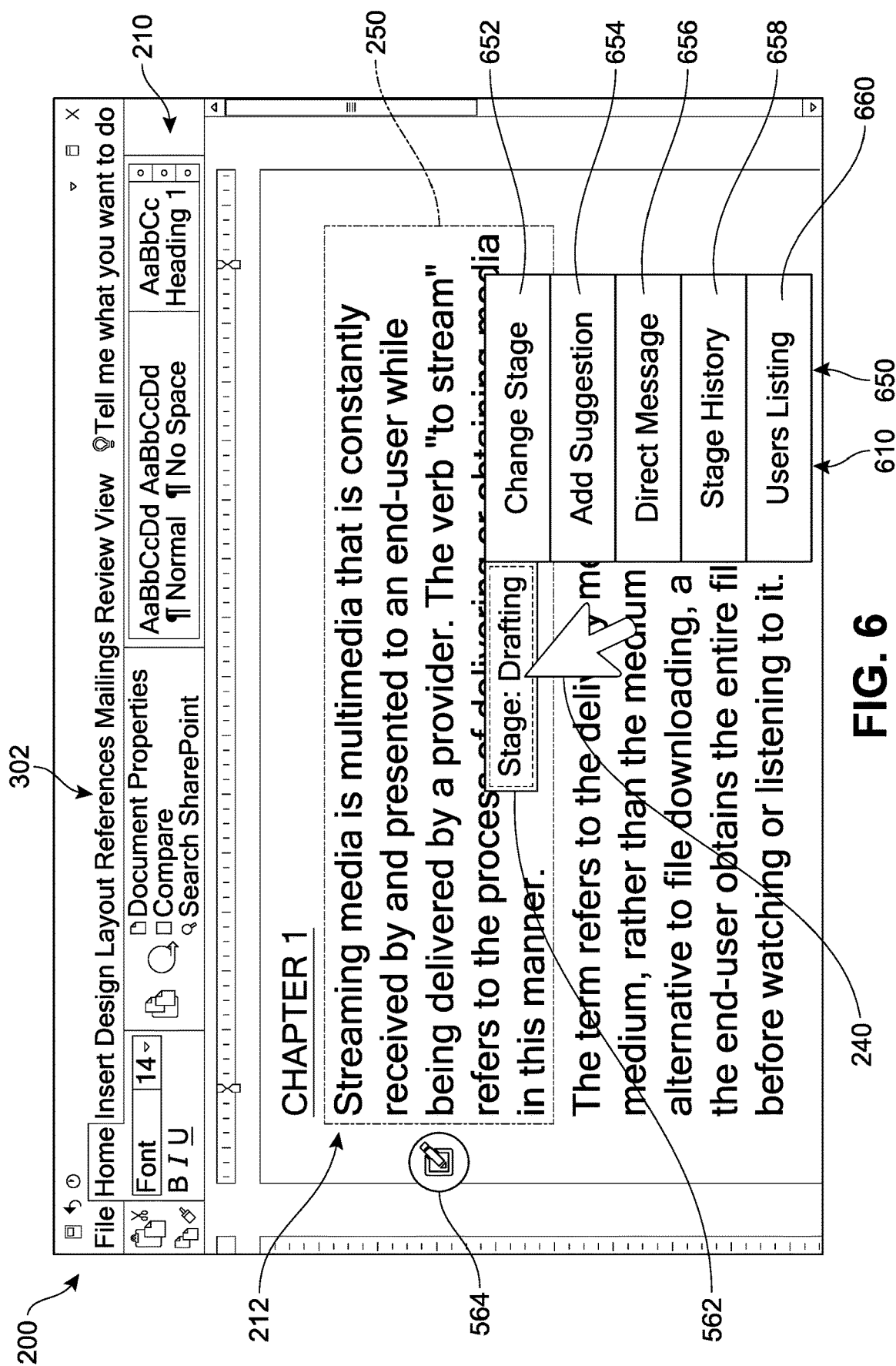
FIG. 6 is a display diagram illustrating an implementation of the word processor with a second menu.

Referring next to the sequence of FIGS. 5 and 6, an example of a content element that has been tagged (see FIGS. 2-4) is shown. During navigation through document 212, a user may select or otherwise interact with segments of the document that include one or more portions—or the entirety—of the first content 250. In this example, a user (the same user from FIGS. 2-4, or a different user) has opened the document 212 and is viewing a section of the document 212 that includes the first content 250.

As shown in FIG. 5, the cursor 240 has navigated over a portion of the first content 250. In this case, when a user moves the cursor 240 to any area of the display associated with the first content 250, the first application 210 displays a stage indicator box ("stage indicator") 510 in response. In this example, the stage indicator 510 is overlaid on a portion of the first content 250; however, in other implementations, the stage indicator 510 can be displayed elsewhere along the display interface. The stage indicator 510 can be configured to present or signal the stage of the content being viewed. In FIG. 5, the stage indicator 510 advises that this content has been assigned a "Stage: Drafting" tag. In this manner, a user may be informed or alerted to the respective workflow stages of various pieces of content as they move through the document. In some implementations, an icon 564 may also or alternatively be presented as a stage indicator to facilitate quick and easy identification of the stage of the content.

In some cases, the system may determine a triggering event has occurred before displaying the stage indicator. For example, the first application 210 or other components of the client system can detect or otherwise identify a pattern of usage ("usage pattern"), telemetry, or user device behavior that can correspond to a triggering event. The triggering event can include, but is not limited to, selection of any portion of the first content 250, attempts by the user to interact or modify the any portion of the first content 250, viewing the first content 250, and/or hovering or moving the cursor over the first content 250. The system may identify these actions as corresponding to a usage pattern or a specific event. Thus, in some implementations, the system can be configured to determine, during use of the first application 210, that a triggering event has occurred based on a detected occurrence of a particular usage pattern. In response to such a determination, the first application 210 may present or display the stage indicator. It should be understood that in some implementations, the stage indicator itself may include or serve as a native control (see for example FIG. 6).

Furthermore, in other implementations, the triggering event or user interaction is not necessary to elicit the display of any stage indicator associated with the first content 250. In other words, in some implementations, the label and/or graphical icon may be displayed in the document in a substantially continuous manner after the tagging has occurred, without any further events. In this case, any stage indicators are visible to all or some users whenever the document is viewed. Furthermore, the stage indicator can be displayed until a user with permissions to edit the indicator removes the association, or after a set period of time has passed (see for example FIG. 8).

Referring now to FIG. 6, in different implementations, the system may include provisions for modifying or generally managing the stage that has been associated with a content element. In FIG. 6, the stage indicator 510 also functions as a native control. As a user navigates to the stage indicator 510 with the cursor 240, the system may determine a trigger event has occurred, such as clicking the stage indicator 510 with a mouse, hovering over the stage indicator 510, pressing a key while hovering over the stage indicator 510, or otherwise inputting a command to view tools and tasks that are available for use with the stage indicator 510.

In this case, in response to a triggering event, the first application 210 displays another native control in the form of a second menu 610, which lists a plurality of options that may be related to the particular stage identified in the stage indicator, or may be related to the fact that any stage has been assigned to the content. In FIG. 6, the native control is presented as a floating drop-down menu. However, in other implementations, the native controls can include a pop-up window, a dialog box or window, a window extending from the stage indicator or can include any other application communication or presentation means. As shown in the example of FIG. 6, the second menu 610 is overlaid on the first application's main interface. The specific location of the second menu 610 represented in FIG. 6 is intended to underscore the relationship of the message of the second menu 610 with the first content 250. However, it should be understood that in other implementations, the second menu 610 may be displayed or generated anywhere else on the screen(s) associated with the client's system, including spaced apart from, adjacent to, or around the first application 210.

In the specific example shown in FIG. 6, the second menu 610 includes a series of stage options 650. In some implementations, the second menu 610 can also include one or more options normally provided when the triggering event is registered by the system, regardless of whether a content element selection has been made, such as "Cut", "Copy", "Paste", etc. though in other implementations, only options related to the specific stage indicator may be provided.

It should be understood that the options shown in FIG. 6 are for illustrative purposes only, and in different implementations, the types and indicators of options can vary. In this example, the stage options 650 include a first option 652 ("Change Stage"), a second option 654 ("Add Suggestion"), a third option 656 ("Direct Message"), a fourth option 658 ("Stage History"), and a fifth option 660 ("Users Listing"). In other implementations, there may be fewer or greater number of options, and/or the options made available may differ from those shown here. In other implementations, any other alphanumeric text or graphics may be displayed in conjunction with the menu.

In different implementations, each option type can be associated with a variety of actions. For example, the Change Stage option (first option 652) may direct users to another menu or options (see FIG. 4) where a different stage may be assigned to a content element, replacing or supplementing the previous stage selection. For example, a new, second stage may be added to and displayed with the same content element (for example, by a second, different user) while the previous stage continues to be displayed, such that multiple stages can be associated with a piece of content. Furthermore, the Add Suggestion option (second option 654) can be configured to provide users with a mechanism of adding comments, notes, ideas, or other information and associating this information with the stage that is currently attached to the content element. In such cases, the suggestion may be made available and/or displayed with the stage indicator when the content element is viewed.

In some implementations, the system can also include provisions for facilitating communication between members collaborating on a document. The Direct Message option (third option 656) can be configured as a tool for transmitting a message to one or more users of the document. Examples of communication types that may be offered to a user are a general group message, private message, direct message, quick poll message, picture message, video message, user created chat room, 'pings' and other such communications. In different implementations, certain types of messages may be sent by the client system automatically, without a user's input. Such messages or notifications can include data about the users of the document, the status of the users (e.g., online, offline, typing), status on messages (e.g., who read the message, whether the message was read), location of the users (e.g., Washington, D.C., Seattle, London, etc.), users' personal or condition updates, and/or status about the collaboration group (e.g., the number of users, whether a user was added to the group or was removed, etc.). When the user selects a message-based option, they may be presented with a data entry box to input a message. The message may be sent to all participants in the conversation, or only selected participants. In addition, participants may also receive special notification (e.g., sound, appearance, e-mails) of the message.

The Stage History option shown here (fourth option 658) can be configured as a tool to facilitate viewing or accessing of previous workflow stages that were assigned to a particular piece of content, and/or other data that had been tagged to a particular piece of content in the document. This tool allows a user to examine changes to and development of a specific content element at different points in time by different users, stages and comments that have been attached to the content element, and/or provide an opportunity to review or 'catch-up' on the progress of a content element. Such an option can decrease delays that may occur when users attempt to make modifications that had previously been suggested and dismissed, and/or reduce the chance of redundant suggestions or modifications. In some implementations, users can receive or access updates associated with the content element and keep abreast of changes or suggestions to sections of the document they are authoring or have a specific interest in, rather than sifting through the document in its entirety for information relevant to their workflow.

In addition, in some implementations, the user may be presented with an option to view the Users Listing (fifth option 660), or the directory of participants in the collaborative workflow. This listing can include contact information, records of each participant's contributions, stage changes, comments, suggestions, access, times each user made changes, content elements assigned to each participant, content elements modified by a participant, and other such useful information for respective content elements. Furthermore, in some cases, the Users Listing or other similar option may allow a search of users who have performed certain tasks, or made changes during a specified time period. Similarly, in one implementation, there may be options to sort by a particular category or filter the listing by a desired category. For example, in some implementations, the system may be configured to allow users to search for pieces of content based on its assigned workflow stage or by whom (i.e., which user) set a piece of content to a particular stage.

Figure 7:
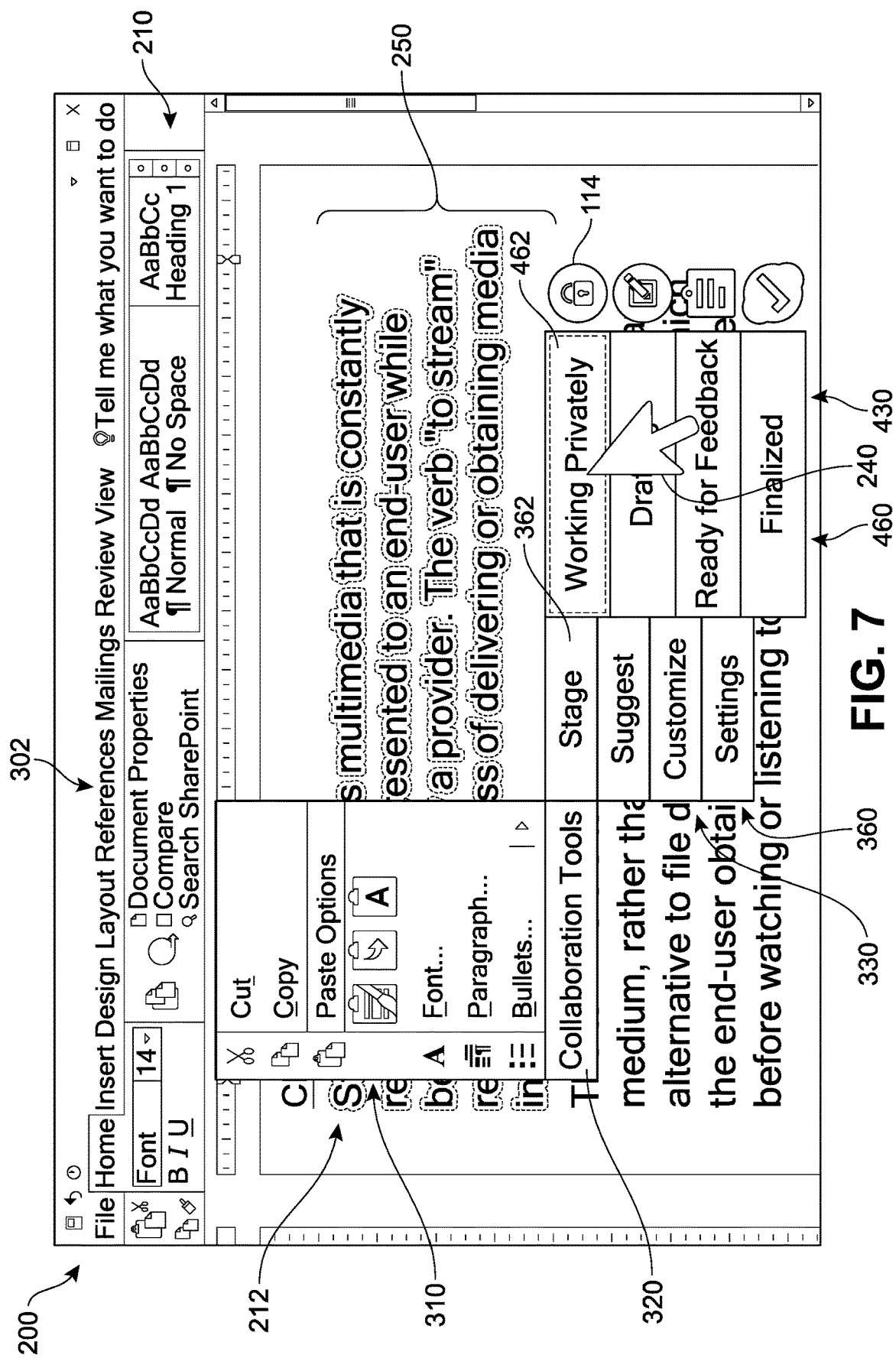
FIG. 7 is a display diagram illustrating an implementation of the word processor with the second submenu.

As noted earlier, other, different stages beyond that of "Drafting" can be selected for association with a content element in an electronic document. Referring to the sequence of FIGS. 7 and 8, when a user interacts with the first content 250 and/or when the first submenu 330 is displayed (see FIGS. 2-4), content sub-options 360 associated with the content option 320 may also be displayed or offered. In FIG. 7, it can be seen that the first sub-option 362 "Stage" has been selected, resulting in the display of the second submenu 430, listing stage sub-options 460 associated with the first sub-option 362 (described in FIGS. 3 and 4). In this example, the stage sub-options 460 include the fifth sub-option 462 ("Working Privately"), among other options. The lock icon 114 is also presented alongside the option.

Figure 8:
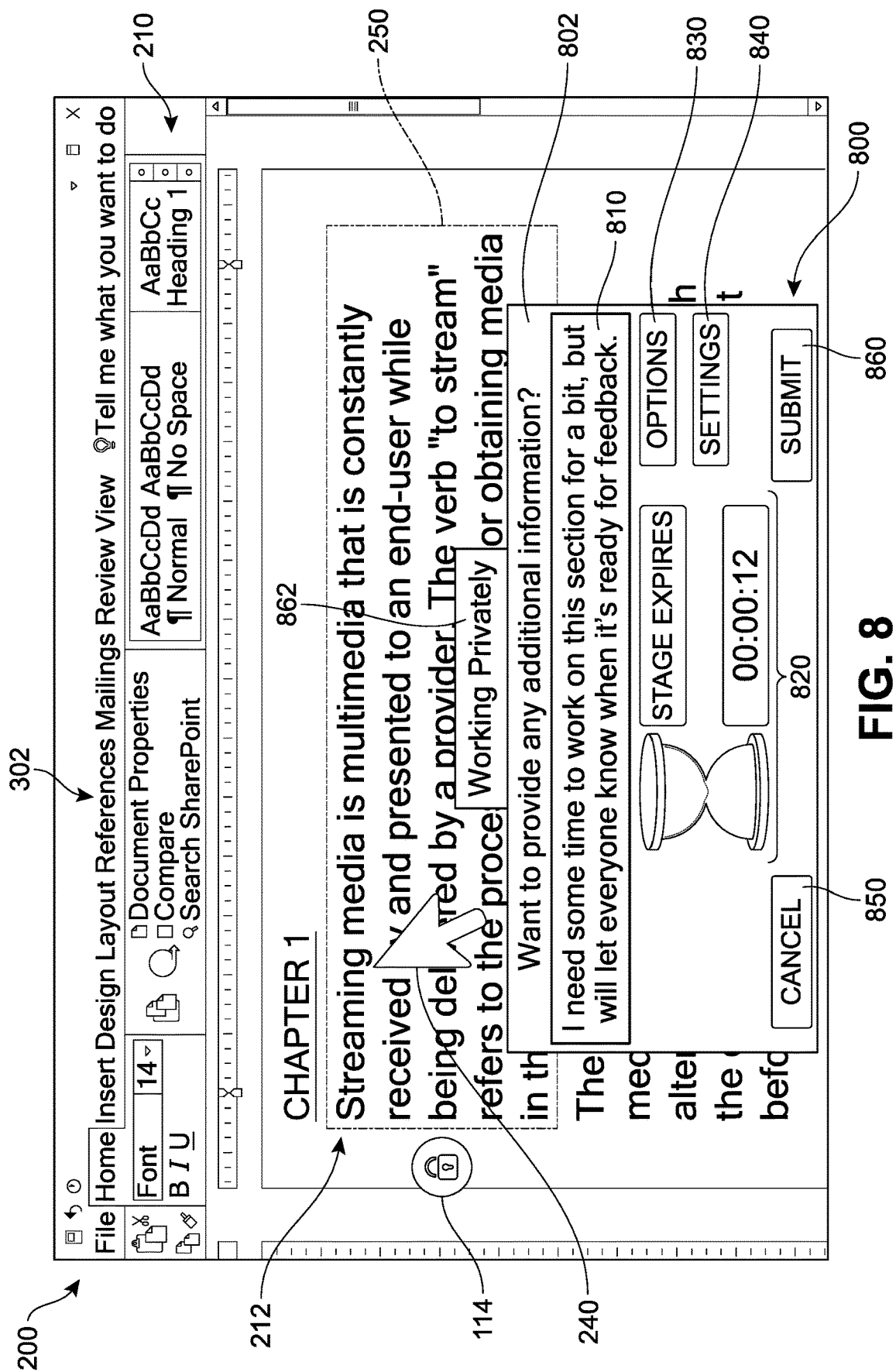
FIG. 8 is a display diagram illustrating an implementation of the word processor with a first dialog box.

In one implementation, the system can be configured to determine, during use of an application, that a particular triggering event has occurred; in FIG. 7, the event can correspond to a selection of the stage sub-option "Working Privately". In response to a determination that a triggering event has occurred, the system may present or display a native control, such as a user interface element or GUI. In FIG. 8, the GUI presented is a small pop-up window or a dialog box, herein referred to as a first dialog window ("first dialog") 800. In some implementations, the first dialog 800 may be overlaid or displayed concurrently with the first menu 310, the first submenu 330 and/or the second submenu 430. In FIG. 8, the previous GUIs have been removed and only the first dialog 800 is shown in relation to the document 212.

As noted earlier, in different implementations, the first application 210 can be configured to provide a mechanism through which the user can insert comments, notes, ideas, or other information and then associating this information with the stage of a content element. This information can then be displayed with the stage indicator when the content element is viewed. In different implementations, the first dialog 800 can include provisions for customization of a selected stage, associating additional information to the stage, and/or adjusting policy settings associated with the stage. In some implementations, the first dialog 800 includes a listing or other representation of one or more tools or features that are available in connection with the selected stage. In this example, the first dialog 800 includes a stage identifier ("Working Privately") 862, a notification header 802, a data entry box 810, a control module 820, a first interactive button ("Options") 830, a second interactive button ("Settings") 840, a third interactive button ("Cancel") 850, and a fourth interactive button ("Submit") 860. In other implementations, one or more of these aspects may be omitted, and/or additional aspects may be included. For example, there may be fewer or greater number of options, and/or the options made available may differ from those shown here. In some implementations, any other alphanumeric text or graphics may be displayed in conjunction with the menu.

The stage identifier 862 can be configured to remind or notify the user which stage has been assigned to the selected content element. In addition, the notification header 802 can announce or identify the general feature being offered. In this case, the notification header 802 asks "Want to provide any additional information?" though in other implementations, the notification header 802 can display any other data or information. Adjacent to the notification header 802 is a data entry box 810, configured to receive input that can be paired, linked, connected, coupled, joined, or otherwise associated with the stage that was previously assigned to the content element. In FIG. 8, the input "I need some time to work on this section for a bit, but will let everyone know when it's ready for feedback" has been entered. Once a user enters the desired information, they may select an interactive button (such as fourth interaction button 860) to submit and store the information, press Enter, or otherwise save the information. The comment or message may be sent to all participants in the conversation or only selected participants (as per the default or custom settings), and/or be presented when the content element is viewed (see FIG. 9).

In different implementations, each interactive button can be associated with a variety of actions. For example, the first interactive button 830 can be configured to route a user to another UI for making various modifications to the collaboration tools, changing the stage, inserting or uploading files or other data types, initiating or continuing communications between collaborating participants, viewing stage history or user listings, customizing the collaborative experience, or other such options. In addition, the second interactive button 840 can be configured to allow a user to adjust display, content, format, user, access, and other settings associated with the collaboration tools, or more specifically the stage indicator assigned to the selected content element. If a user no longer wishes to add additional information or make any changes, they may select a button such as third interactive button 850 and cancel the selection and/or close the dialog window.

In some implementations, the system may be configured to regulate or further manage various collaboration tools associated with a content element(s). As an example, FIG. 8 shows the first dialog 800 with control module 820. Although the particular settings or functions offered by the control module 820 can vary, generally the control module 820 can be understood to provide a means of adding or adjusting restrictions, rules, policies, or other limitations directly associated with the stage indicator. In FIG. 8, the control module 820 is a timer management tool that may be used to implement a countdown clock or timer—or otherwise schedule the display or association of a specific stage indicator. Thus, in some implementations, a user may directly indicate how long a stage should be associated or tagged with a content element, whether the stage should remain until a certain event occurs and/or is detected, who can interact with the content element or modify the stage and corresponding information, specify which policy setting should be applied to which user, and other such instructions or functions.

Figure 9:
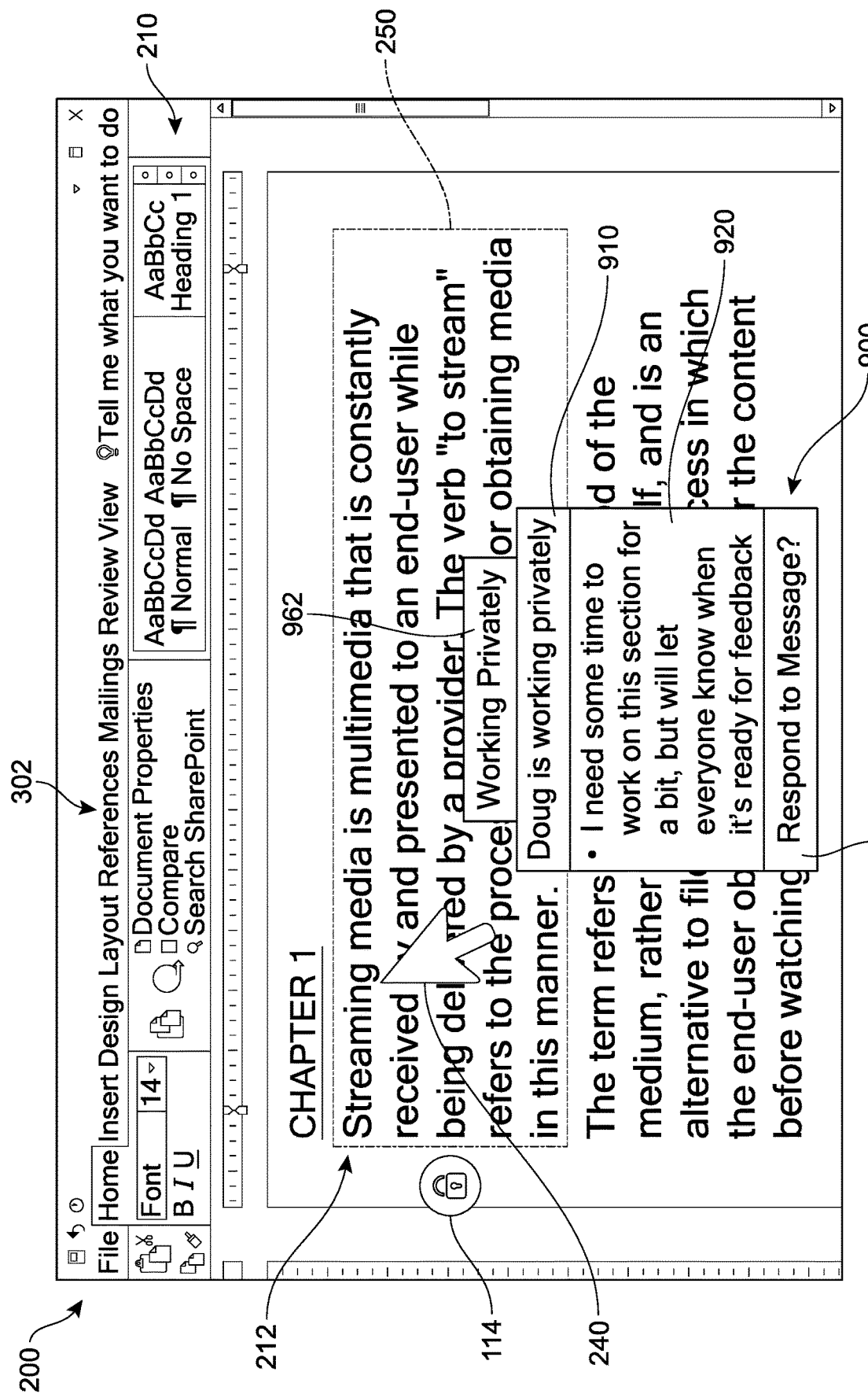
FIG. 9 is a display diagram illustrating an implementation of the word processor with a second dialog box.

Referring now to FIG. 9, an example of a content element being presented with a stage indicator 962 and a corresponding information box 900 is shown. During navigation through document 212, a user may select or otherwise interact with segments of the document that include one or more portions—or the entirety—of the first content 250. In this example, a user has opened the document 212 and is viewing a section of the document 212 that includes the first content 250.

In FIG. 9, the stage indicator 962 advises that this content has been assigned a "Working Privately" tag. In this way, a user may be informed or alerted to the stage or condition as they move through the document. In some implementations, an icon, such as lock icon 114, may also or alternatively be presented as a visual tag for quick and easy identification of the stage of the content. In some implementations, when a user moves the cursor 240 to any area of the display associated with the first content 250, the first application 210 displays both the state indicator 962 and the information box 900 in response. However, in other implementations, the system may wait until it determines that a particular triggering event has occurred before presenting the information box 900. In different implementations, the information box 900 can be configured to clarify or expand on the stage of the content being viewed, or otherwise display data that had been entered by a user in connection with the assigned stage. In this example, the information box 900 is overlaid on a portion of the first content 250; however, in other implementations, the information box 900 can be displayed elsewhere along the display interface.

In some implementations, the system can automatically identify the user that has assigned the stage indicator (the "tagger"). In FIG. 9, the information box 900 includes a summary header 910 with the name of the tagger and workflow stage ("Doug is working privately"). The information box 900 can also include an optional message dialog 920 in cases where a user has entered a message for association with the stage indicator. For purposes of illustration, the message shown in FIG. 9 reflects the input provided in FIG. 8.

Furthermore, in some implementations, the information box 900 can also include provisions for direct interaction with the displayed information. For example, as described earlier, the system can include provisions for facilitating communication between members collaborating on a document. In this case, a fifth interactive button 930 ("Respond to Message?") can be selected to allow users to broadcast or transmit a response to one or more users or accessors of the document with reference to the assigned stage indicator and/or the displayed message. The message can be appended to the stage currently associated with the content element, and in some implementations, the message can include provisions for initiating a chat or communication forum directed to the particular stage or comment.

Referring now to FIG. 10, an example of a representative architecture of a content element management system ("system") 1000 is depicted. In different implementations, the system 1000 can be configured to present user interfaces for receiving workflow stage tags to be associated with a particular subset of data in the document. The system 1000 can be further configured to present additional options based on the stages selected. It can be understood that the system 1000 presented here is merely an example implementation and that a wide variety of other implementations are possible.

In different implementations, the system 1000 can include one or more end-user systems 1010. As shown in FIG. 10, the end-user systems 1010 include a first end-user system 1012 for a first user 1014. The first end-user system 1012 includes a display device 1016 used in connection with an application 1020 to display graphical elements generated by a user interface 1030 to the first user 1014. The first end-user system 1012 also includes one or more input devices 1018 used to receive commands or other input from the user 1014, from which the first end-user system 1012 is configured to generate corresponding user input 1040 for the application 1020. In the particular example illustrated in FIG. 10, the end-user systems 1010 also include a second end-user system 1013 for a second user 1015. The second end-user system 1013 includes a display device 1017 and one or more input devices 1019, and is configured for use in connection with the application 1020 much as described for the first end-user system 1012. Each of the users (such as first user 1014 and second user 1015) of the application 1020 may be associated with different user identifiers, such as usernames and/or numbers.

The user interface 1030 included in the application 1020 generates various graphical user interfaces for viewing and editing an electronic document 1050. For example, the user interface 1030 may be configured to generate the various user interfaces described above in connection with FIGS. 1-9, including but not limited to the menus, submenus, options, sub-options, stage indicators, dialog boxes, and other input or presentation interfaces. In addition, the user interface 1030 may be configured to generate the user interfaces described further below with respect to FIGS. 11-14. The user interface 1030 includes a content element display component 1032 (or "content display component") configured to display content elements 1052 included in the electronic document 1050. The user interface 1030 further includes a content element selection component ("content selection component") 1034 configured to identify at least one selected content element 1035 from the content elements 1052 in response to a content element selection input 1044 included in the user input 1040. For example, the user 1014 may operate an input device 1014, such as a mouse, to highlight the selected content element 1035, much as illustrated in connection with FIG. 2. The content display component 1032 may be configured to graphically identify the selected content element 1035 as having been selected.

The user interface 1030 also includes a workflow stage selection component ("stage selection component") 1036 configured to display workflow stage options ("stage options") 1066 applicable to the selected workflow stage 1037. The workflow stage selection component 1036 is invoked in response to a triggering event input 1042 detected by a triggering event detector 1022 included in the application 1020. For example, the triggering event may be a right-click mouse input, as described in connection with FIG. 3. The workflow stage selection component 1036 is configured to operate much as described in connection with FIGS. 3 and 4, and identifies a selected workflow stage 1037 in response to a stage selection input 1046. In response to the identification of the selected workflow stage 1037, a workflow stage recorder 1024 included in the application 1020 records an association between the selected content element 1035 and the selected workflow stage 1037 as workflow stage data 1054 for the electronic document 1050. The resulting electronic document 1050 and/or recorded associations may be stored to and retrieved from a document storage 1070. The document storage 1070 can be located in a network or cloud storage or locally on a client computing device. In different implementations, the associations may be stored within the file containing the electronic content, or as a separate file or set of data that is linked to the electronic content.

The content display component 1032 is configured to display an indication that a displayed content element 1052 is associated with corresponding workflow stage data 1054. For example, each of the workflow stage options 1066 may be associated with a respective one of workflow stage indicators 1064, which each identify how the content element display component 1032 should depict an association between a content element 1052 and one of the workflow stage options 1066. The workflow stage indicators 1064 may identify colors or images used for displaying an association of a content element with each of the workflow stage options 1066.

In some implementations, display of a content element 1052 by the content display component 1032 may further be affected by workflow stage policies 1062 associated with one or more of the workflow stage options 1066. For example, as discussed above with respect to FIGS. 6-9, some workflow stages can be further associated with specific access policies. In one implementation, the application of a workflow stage to a content element by one user of a collaborative document will automatically reduce access to the particular content element to one or more other users. Some types of access that can be automatically modified by association of a workflow stage to a content element include restricting viewing access of the content element to a single user or to fewer than all of the users in the collaborative group; restricting editing access of the content element to only a single user or to fewer than all of the users in the collaborative group; modifying viewing access so that all changes being made by the user responsible for tagging the content element (the "tagger") are not apparent until the tagger removes the tag for the workflow stage; and/or modifying editing access such that edits made to the content element by a non-tagger are automatically removed and stored in a copy of the content element and presented as a suggestion or direct message to the tagger.

It should be understood that the foregoing is just one example implementation of a collaborative document tagging system in which actions with respect to electronic documents and actions related to workflow stages for specific pieces of content are stored, in a way that relates the associations to the electronic document. Other implementations of such systems will vary at least in the type of data stored, in the manner in which such data is stored, and in how such data is collected from end user applications.

Thus, in different implementations, the diagram presented in FIG. 10 can include additional components and modules that are not shown here. For example, the end-user systems may be understood to include an operating system configured to help manage communications between various components in system 1000. Similarly, the application 1020 can include provisions for storing, retrieving, and receiving associations between workflow stages and content elements, as well as determining the occurrence of a triggering event, executing instructions, displaying various UIs. In other implementations, the architecture described herein may vary. For example, in some implementations, a trigger determination module or trigger event detector may be independent of the application 1020

Figure 11:
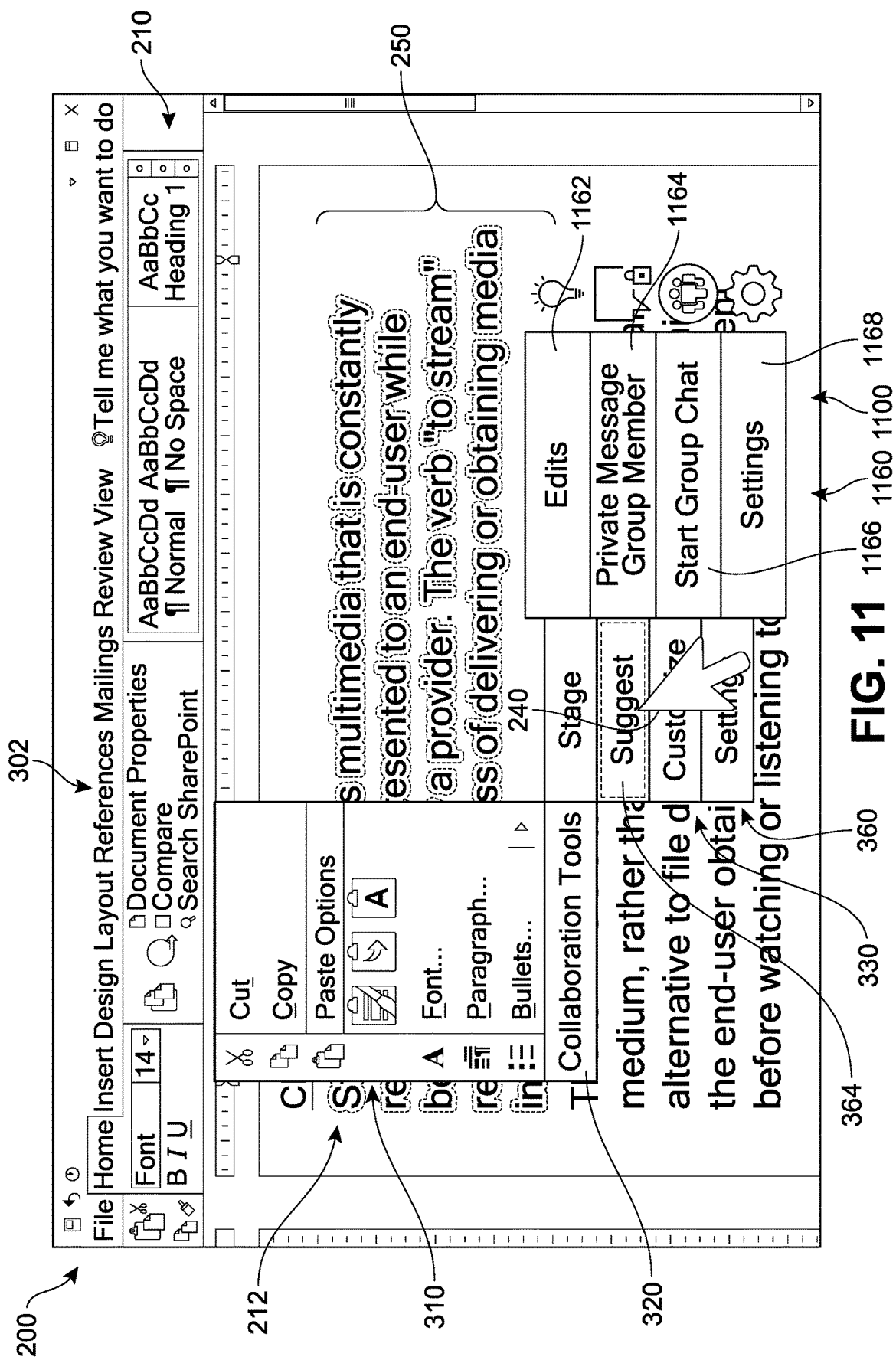
FIG. 11 is a display diagram illustrating an implementation of the word processor with a third submenu.
Figure 12:
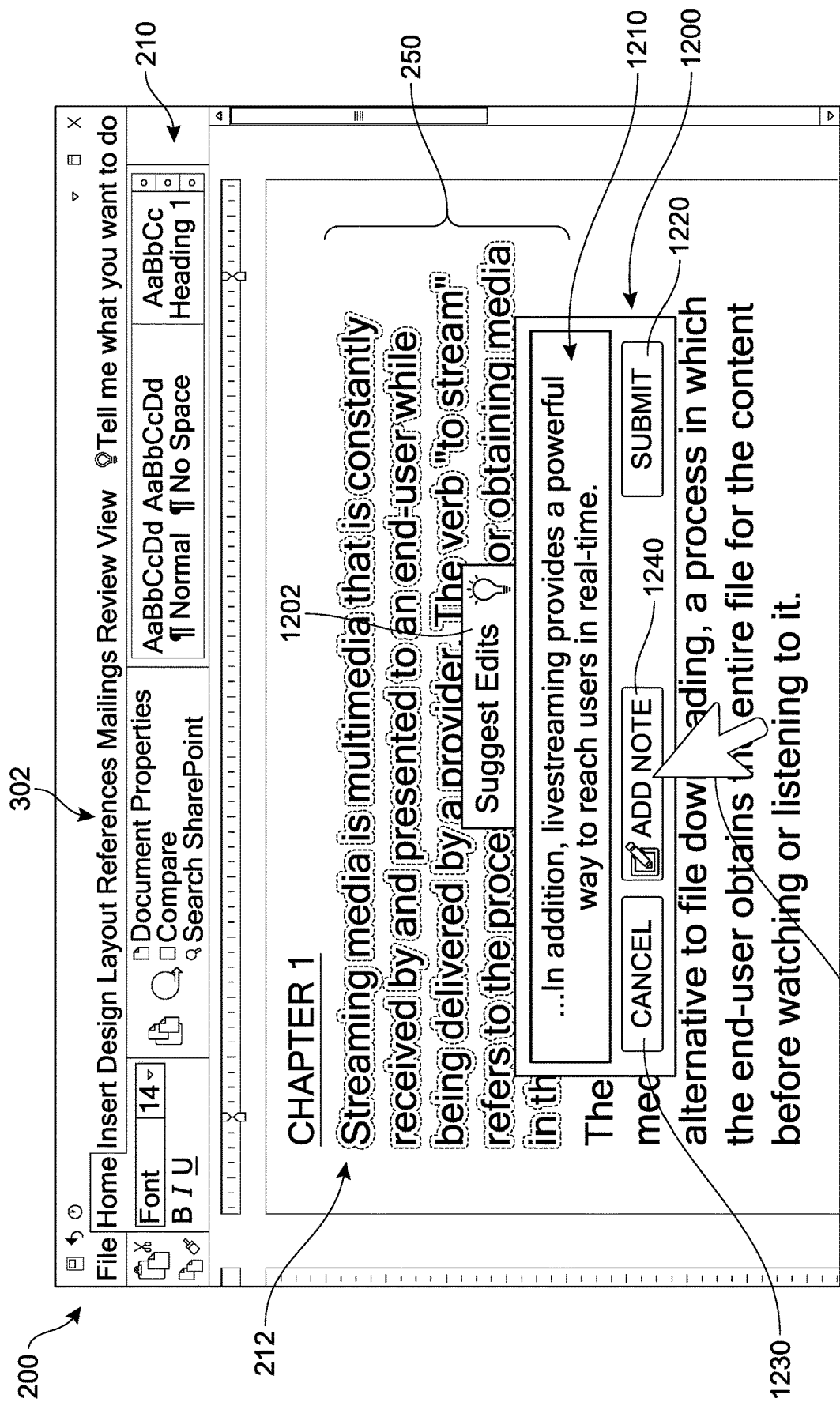
FIG. 12 is a display diagram illustrating an implementation of the word processor with a third dialog box.
Figure 13:
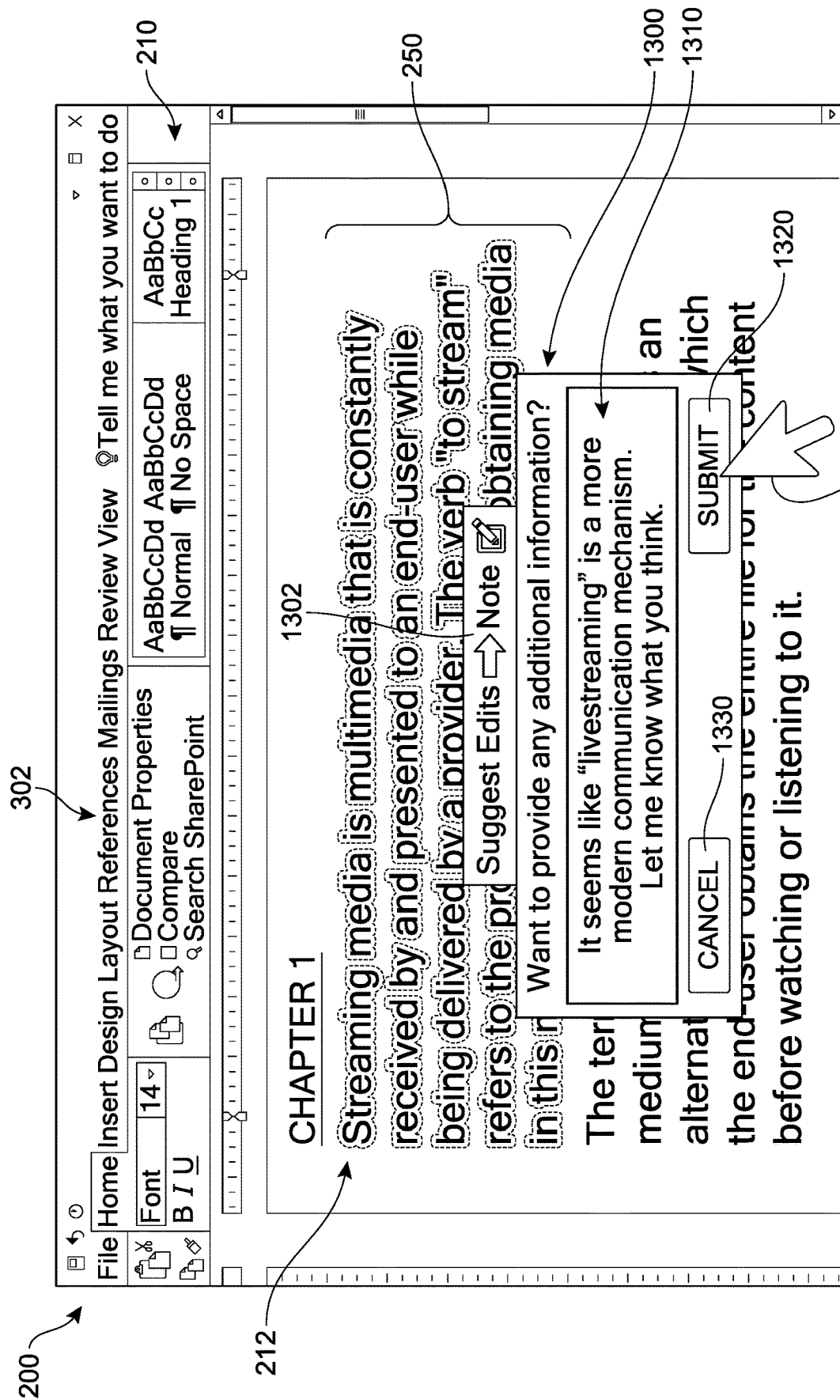
FIG. 13 is a display diagram illustrating an implementation of the word processor with a fourth dialog box.

In different implementations, the system may also include provisions for directly interacting with tagged or untagged content elements. As noted above, the Suggest option can be configured to provide users with a mechanism of adding comments, notes, ideas, or other information and associating this information with the content element so that the suggestion is available and/or displayed with the content element when the content element is viewed. In the sequence of FIGS. 11-13, an example of this mechanism is presented.

Referring first to FIG. 11, when a user interacts with the first content 250 and/or the first submenu 330 is displayed (see FIGS. 2-4), a user may be offered content sub-options 360 associated with the content option 320. In FIG. 11, it can be seen that the second sub-option 364 identified as "Suggest" has been selected, resulting in the display of a fourth submenu 1130 that offers a plurality of suggest sub-options 1160. In this example, the suggest sub-options 1160 include a ninth sub-option 1162 ("Edits"), a tenth sub-option 1164 ("Private Message Group Member"), an eleventh sub-option 1166 ("Start Group Chat"), and a twelfth sub-option 1168 ("Settings"). In other implementations, there may be fewer or greater number of sub-options, and/or the sub-options made available may differ from those shown here. In other implementations, any other alphanumeric text or graphics may be displayed in conjunction with the selection.

In some implementations, as shown in FIG. 11, each suggest sub-option can be displayed with an icon that can permit a user to quickly identify the category or task and/or the function of the option. In one implementation, a suggest sub-option may be offered that was previously inputted, added, or otherwise customized by a user. For example, a user may have previously accessed the Settings options for the Collaboration Tools, and manually entered and/or added various suggest options, such as an option labeled "Insert References" configured to open another GUI that includes fields for entry and/or storage of information necessary to generate a reference citation. Other options could include "Compare Changes" or "Dismiss Suggestion" or "Search Online" or any other review, editing, or commenting option, which can be presented as a suggest sub-option in the second submenu 1130. Each option can also be customized to be associated with specific policy settings, and/or one or more default policy settings. In some implementations, suggest sub-options manually entered by a user can be added to a directory of sub-options that can be stored or retained in local or cloud storage, and can be offered as potential choices during later workflows.

Furthermore, in some implementations, the system can include provisions for facilitating communication between members as more directly related to a suggestion or comment for a specific content element. Various options can be offered, such as but not limited to the "Private Message Group Member" or "Start Group Chat" options. In some implementations, selection of these types of options can generate a message that includes a link or automatic navigation to the selected content element, thereby providing context for the message. In some implementations, a direct message option can be offered to a user. When the user selects a communication-based option, they may be presented with a data entry box to input a message, or an email window may open for transmission of the message. The message may be sent to all participants in the conversation, or only selected participants. In addition, participants may receive the selected content and/or suggested edits or comments in the message(s), thereby simplifying and expediting the collaboration and review process.

In different implementations, the first application 210 can present a mechanism through which the user can suggest changes, additions, deletions, formatting, or other edits of the selected content element. For example, the third dialog 1200 can include provisions for edits to a copy of the content element, where changes may be made tentatively or presented for review by others without direct interaction or modification to the text in the document itself. In some implementations, upon confirmation of the edits, the changes can be accepted and incorporated into the document. Referring to FIG. 12, the suggest option labeled "Edits" has been selected. In response, the system may present a GUI, herein referred to as a third dialog window ("third dialog") 1200.

In FIG. 12, the third dialog 1200 includes a main header ("Suggest Edits") 1202, a data entry box 1210, a first interactive button ("Submit") 1220, a second interactive button ("Cancel") 1230, and a third interactive button ("Add Note") 1240. In other implementations, one or more of these aspects may be omitted, and/or additional aspects may be included. For example, there may be fewer or greater number of options, and/or the options made available may differ from those shown here. In some implementations, any other alphanumeric text or graphics may be displayed in conjunction with the menu.

The main header 1202 can remind or notify the user which option was selected, and/or identify the general feature being offered, though in other implementations, the main header 1202 can display any other data or information, or may not be included. Adjacent to the main header 1202 is a data entry box 1210, configured to receive input that can be associated to the content element. In some implementations, the data entry box 1210 can include the text or data that is currently included in the selected content element. For purposes of brevity in FIG. 12, an ellipsis (" . . . ") is shown to represent the text of first content 250.

In the example of FIG. 12, the text that has been inputted into data entry box 1210 is being suggested as an additional sentence, to follow the text currently included in the selected content element. In this case, the entry is "In addition, livestreaming provides a powerful way to reach users in real-time." Once a user enters the desired suggestion, they may select an interactive button (such as first interaction button 1210) to submit and store the information, press Enter, or otherwise save the information. The suggestion may be sent to all participants in the conversation or only selected participants (as per the default or custom settings), and/or be presented with the content element when the document is viewed. If a user no longer wishes to make a suggestion, they may select a button such as second interactive button 1230 and cancel the selection and/or close the dialog window.

In some implementations, the system may further include provisions to permit supplemental information to be associated with a suggested edit. As an example, FIG. 13 illustrates a fourth dialog box ("fourth dialog") 1300, displayed in response to selection of the third interactive button 1240 in FIG. 12. In this case, the fourth dialog 1300 is a GUI offering a Comment or Follow Up note tool. Although the particular settings or functions offered by the fourth dialog 1300 can vary, generally the fourth dialog 1300 in FIG. 13 can be understood to provide a means of adding notes, ideas, reasons, references, messages, or other information directly associated with the edit suggestion entered via the previous GUI.

In FIG. 13, the fourth dialog 1300 includes a tool header 1302 ("Suggest Edits→Note"), a data entry box 1310, a first interactive button 1320, and a second interactive button 1330. In other implementations, one or more of these aspects may be omitted, and/or additional aspects may be included. For example, there may be fewer or greater number of options, and/or the options made available may differ from those shown here. In some implementations, any other alphanumeric text or graphics may be displayed in conjunction with the menu.

As an example, the tool header 1302 can announce or identify the general feature being offered. In this case, the tool header 1302 asks "Want to provide any additional information?" though in other implementations, the tool header 1302 can display any other data or information. Adjacent to the tool header 1302 is the data entry box 1310, configured to receive input that can be associated to the suggestion now coupled with the content element. In FIG. 13, the example input is "It seems like "livestreaming" is a more modern communication mechanism. Let me know what you think." Once a user enters the desired information, they may select an interactive button (such as first interaction button 1320) to submit and store the information, press Enter, or otherwise save the information. The comment or message may be sent to all participants in the conversation or only selected participants (as per the default or custom settings), and/or be presented with the content element when the document is viewed. In addition, if a user no longer wishes to add additional information or make any changes, they may select a button such as second interactive button 1330 and cancel the selection and/or close the dialog window.

Figure 14:
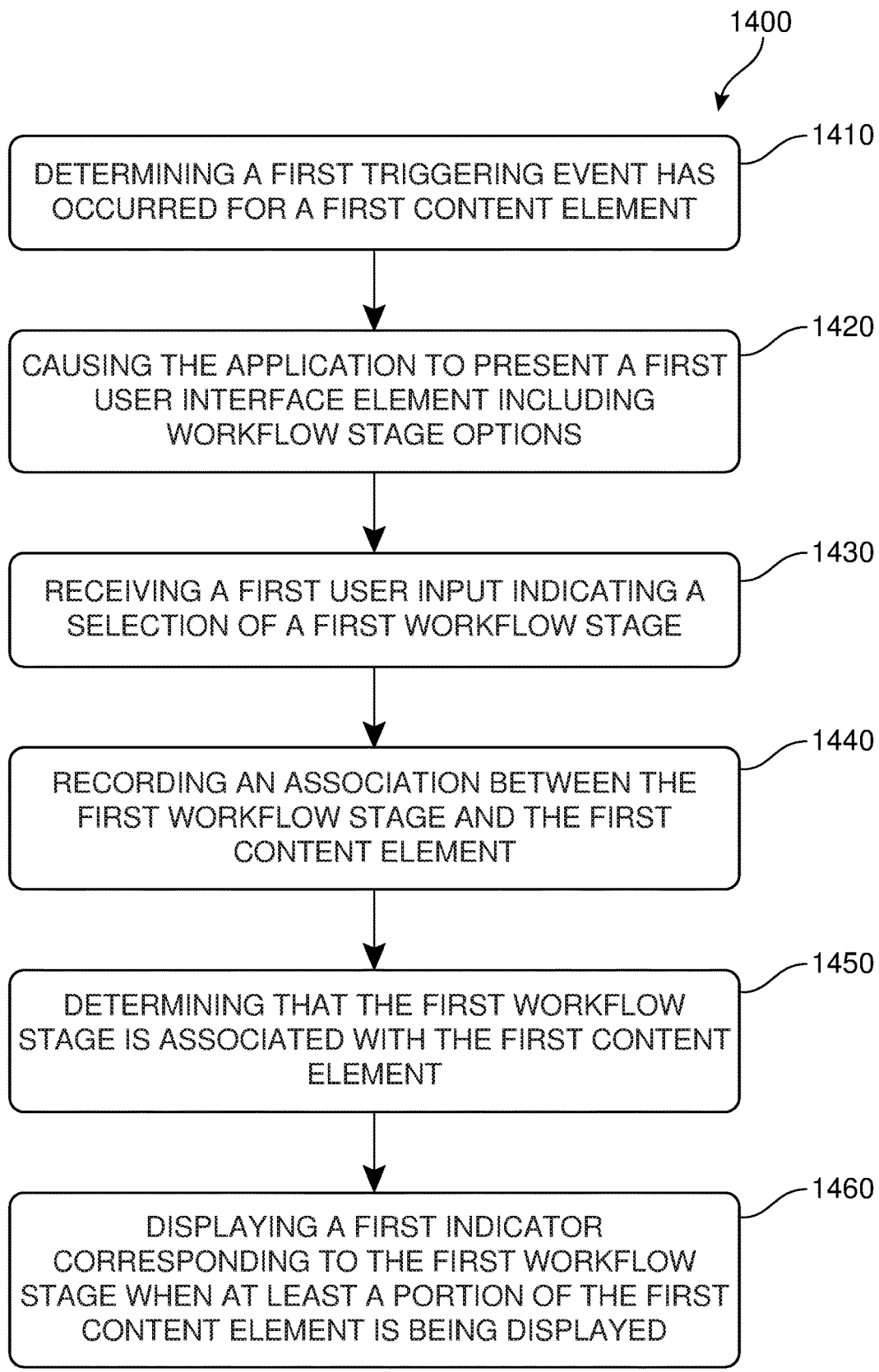
FIG. 14 is a flow diagram illustrating an implementation of a process for managing multi-part document.

Referring now to FIG. 14, a flow chart illustrating an implementation of a method 1400 of tagging specific content in electronic content associated with an application is depicted. In the example of FIG. 14, it is seen that a first step 1410 includes determining (during use of the application) that a first triggering event has occurred for a first content element, where the first content element includes a portion of the electronic content. A second step 1420 includes (in response to the determination that the first triggering event has occurred) causing the application to present a first user interface element including a plurality of workflow stage options. In this case, the plurality of workflow stage options include a first workflow stage. In a third step 1430, a first user input may be received that indicates a selection of the first workflow stage. A fourth step 1440 includes (in response to receiving the first user input) recording an association between the first workflow stage and the first content element. A fifth step 1450 includes determining that the first workflow stage is associated with the first content element. In a sixth step 1460, the method involves displaying a first indicator corresponding to the first workflow stage when information regarding or associated with the first content element is being accessed (in response to the determination that the first workflow stage is associated with the first content element).

In other implementations, additional steps may be included. For example, in cases where the first user input is received from a first user, another step may include reducing access to a second user to the first content element in response to the determination that the first workflow stage is associated with the first content element. The method may further include storing information associated with a user's credentials. This can be used in generating a user listing and/or for filtering or sorting during a search for specific content, stages, users, and other data. In some implementations, the method can include receiving a second user input indicating a selection of the first indicator, and in response to receiving the second user input, causing the application to invoke a second user interface element presenting at least a first option. In cases where the first option includes a third user interface element presenting an editable copy of the first content element (see FIG. 12), the method further can also include receiving a third user input in which the copy of the first content element is modified, and in response to receiving the third user input, recording an association between the third user input and the first content element. Furthermore, a second indicator can then be displayed corresponding to the third user input whenever the first indicator is being displayed.

In different implementations, other steps can be included. For example, in cases where the first option includes a third user interface element that is configured to receive additional information to be associated with the first workflow stage (see FIG. 8), the method can include receiving a third user input through the third user interface element, and in response to receiving the third user input, associating the third user input with the first workflow stage. A second indicator can then be displayed corresponding to the third user input whenever the first indicator is being displayed. In other implementations, the method includes receiving a third user input indicating a selection of the first option, the first option including a second workflow stage that differs from the first workflow stage, and replacing the first workflow stage with the second workflow stage, allowing users to update their progress on a piece of content that had been previously assigned a stage. In one implementation, the method can involve determining that the second workflow stage is associated with the first content element, and displaying a second indicator corresponding to the second workflow stage when information about or associated with the first content element is being accessed in response to the determination that the second workflow stage is associated with the first content element.

In some implementations, the method may include determining, during use of the application, that a second triggering event has occurred for a second content element, the second content element including a portion of the electronic content, and in response to the determination that the second triggering event has occurred, causing the application to present the first user interface element including the plurality of workflow stage options, where the plurality of workflow stage options includes a second workflow stage. The system can then receive a second user input indicating a selection of the second workflow stage, and in response to receiving the second user input, record an association between the second workflow stage and the second content element. Furthermore, there may be a determination that the second workflow stage is associated with the second content element, leading to a display of a second indicator corresponding to the second workflow stage when information about or associated with the second content element is being accessed in response to the determination that the second workflow stage is associated with the second content element.

In another example, where the first option includes a second user interface element configured to receive information specifying a limited a period of time in which the first indicator will be displayed, the method can include receiving a third user input specifying the period of time, and in response to receiving the third user input, associating the period of time with the first indicator (see FIG. 8). In this case, the first indicator can be displayed when information about or associated with the first content element is being accessed but only during the specified period of time. Other steps and features described herein may also be included in the method in different implementations, and in some implementations, certain steps may be omitted.

As noted previously, the ability to provide one or more users a mechanism by which to mark or indicate specific pieces of electronic content with stages (including, but not limited to, working privately, in-progress, ready for feedback, finalized, suggested, etc.) rather than the entire document or file can significantly improve workflow efficiency. In addition, by enabling specific workflow actions or modes based on the selected stage, users are given greater flexibility in their work. For example, if a user marks a piece of content as 'working privately' other users may not be able to make changes or see updates until the user removes the stage indication and/or re-classifies the content as being in a different stage. This type of access management can help a user feel more comfortable in the development of their content, and/or reduce the possibility of other users interfering with the user's work on a specific portion of the document. The system also allows users to provide additional context or initiate a chat or online conversation as to why a specific content element is in a current stage, as well as to provide workflow stage updates in a quick, simple, and effective manner.

The detailed examples of systems, devices, and techniques described in connection with FIGS. 1-14 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-14 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 15:
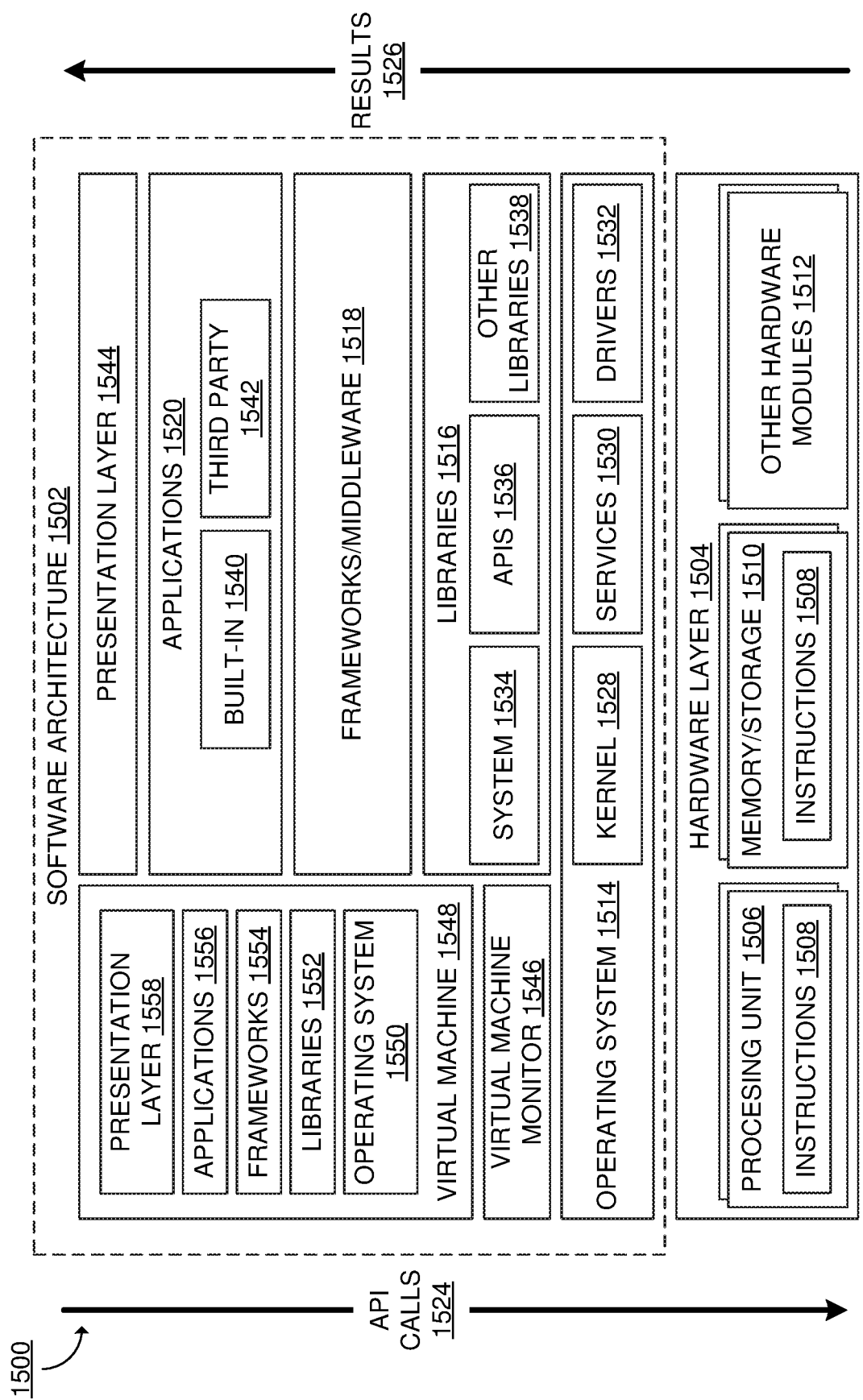
FIG. 15 is a block diagram of an example computing device, which may be used to provide implementations of the mechanisms described herein.

FIG. 15 is a block diagram 1500 illustrating an example software architecture 1502, various portions of which may be used in conjunction with various hardware architectures herein described, which may implement any of the above-described features. FIG. 15 is a non-limiting example of a software architecture and it will be appreciated that many other architectures may be implemented to facilitate the functionality described herein. The software architecture 1502 may execute on hardware such as a machine 1000 of FIG. 10 that includes, among other things, document storage 1070, processors, memory, and input/output (I/O) components. A representative hardware layer 1504 is illustrated and can represent, for example, the machine 1000 of FIG. 10. The representative hardware layer 1504 includes a processing unit 1506 and associated executable instructions 1508. The executable instructions 1508 represent executable instructions of the software architecture 1502, including implementation of the methods, modules and so forth described herein. The hardware layer 1504 also includes a memory/storage 1510, which also includes the executable instructions 1508 and accompanying data. The hardware layer 1504 may also include other hardware modules 1512. Instructions 1508 held by processing unit 1508 may be portions of instructions 1508 held by the memory/storage 1510.

The example software architecture 1502 may be conceptualized as layers, each providing various functionality. For example, the software architecture 1502 may include layers and components such as an operating system (OS) 1514, libraries 1516, frameworks 1518, applications 1520, and a presentation layer 1544. Operationally, the applications 1520 and/or other components within the layers may invoke API calls 1524 to other layers and receive corresponding results 1526. The layers illustrated are representative in nature and other software architectures may include additional or different layers. For example, some mobile or special purpose operating systems may not provide the frameworks/middleware 1518.

The OS 1514 may manage hardware resources and provide common services. The OS 1514 may include, for example, a kernel 1528, services 1530, and drivers 1532. The kernel 1528 may act as an abstraction layer between the hardware layer 1504 and other software layers. For example, the kernel 1528 may be responsible for memory management, processor management (for example, scheduling), component management, networking, security settings, and so on. The services 1530 may provide other common services for the other software layers. The drivers 1532 may be responsible for controlling or interfacing with the underlying hardware layer 1504. For instance, the drivers 1532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1516 may provide a common infrastructure that may be used by the applications 1520 and/or other components and/or layers. The libraries 1516 typically provide functionality for use by other software modules to perform tasks, rather than rather than interacting directly with the OS 1514. The libraries 1516 may include system libraries 1534 (for example, C standard library) that may provide functions such as memory allocation, string manipulation, file operations. In addition, the libraries 1516 may include API libraries 1536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1516 may also include a wide variety of other libraries 1538 to provide many functions for applications 1520 and other software modules.

The frameworks 1518 (also sometimes referred to as middleware) provide a higher-level common infrastructure that may be used by the applications 1520 and/or other software modules. For example, the frameworks 1518 may provide various graphic user interface (GUI) functions, high-level resource management, or high-level location services. The frameworks 1518 may provide a broad spectrum of other APIs for applications 1520 and/or other software modules.

The applications 1520 include built-in applications 1540 and/or third-party applications 1542. Examples of built-in applications 1540 may include, but are not limited to, a contacts application, a browser application, a location application, a media application, a messaging application, and/or a game application. Third-party applications 1542 may include any applications developed by an entity other than the vendor of the particular platform. The applications 1520 may use functions available via OS 1514, libraries 1516, frameworks 1518, and presentation layer 1544 to create user interfaces to interact with users.

Some software architectures use virtual machines, as illustrated by a virtual machine 1548. The virtual machine 1548 provides an execution environment where applications/modules can execute as if they were executing on a hardware machine (such as the machine 1000 of FIG. 10, for example). The virtual machine 1548 may be hosted by a host OS (for example, OS 1514) or hypervisor, and may have a virtual machine monitor 1546 which manages operation of the virtual machine 1548 and interoperation with the host operating system. A software architecture, which may be different from software architecture 1502 outside of the virtual machine, executes within the virtual machine 1548 such as an OS 1550, libraries 1552, frameworks 1554, applications 1556, and/or a presentation layer 1558.

Figure 16:
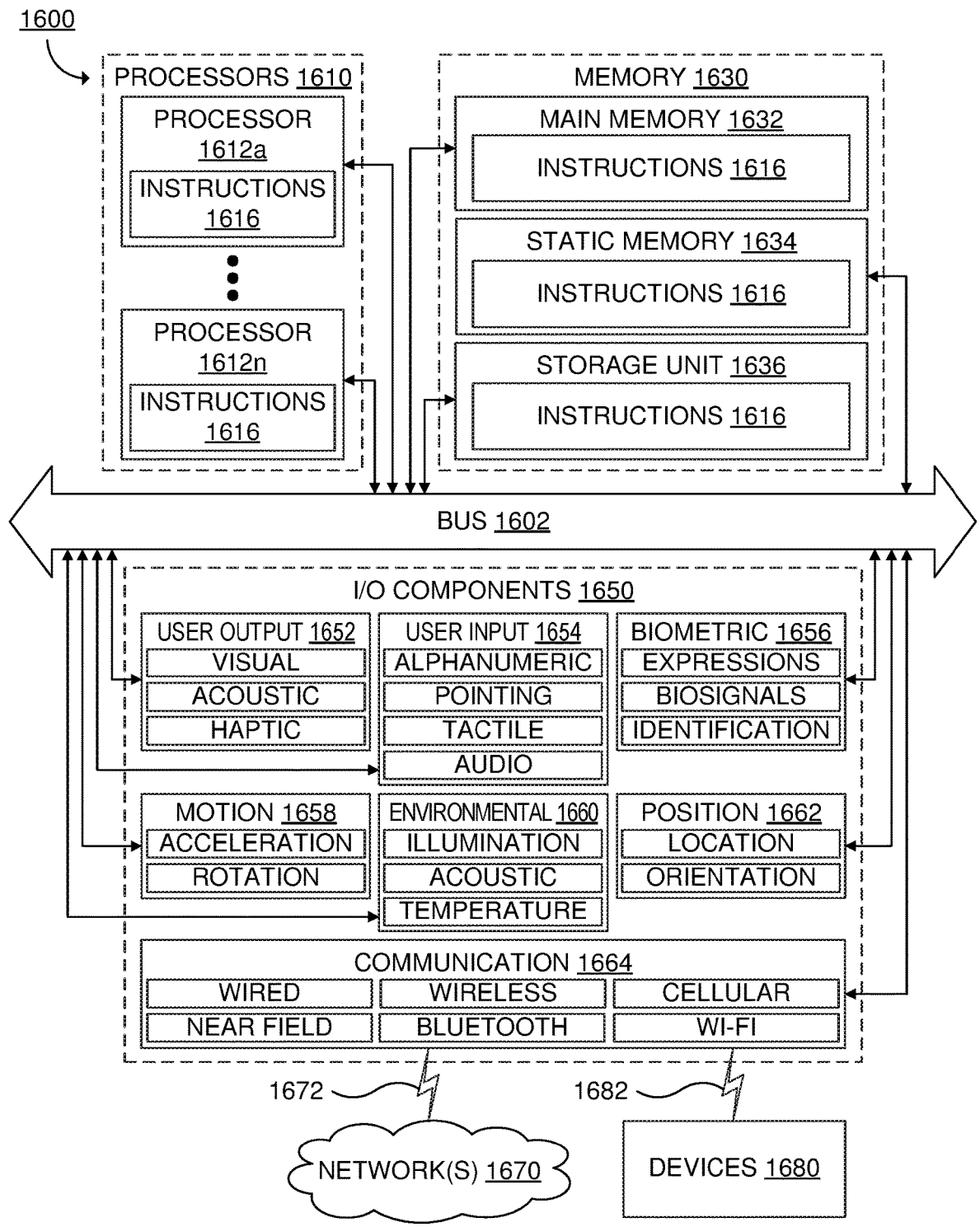
FIG. 16 is a block diagram illustrating components of an example machine configured to read instructions from a machine-readable medium.

FIG. 16 is a block diagram illustrating components of an example machine 1600 configured to read instructions from a machine-readable medium (for example, a machine-readable storage medium) and perform any of the features described herein. The example machine 1600 is in a form of a computer system, within which instructions 1616 (for example, in the form of software components) for causing the machine 1600 to perform any of the features described herein may be executed. As such, the instructions 1616 may be used to implement modules or components described herein. The instructions 1616 cause unprogrammed and/or unconfigured machine 1600 to operate as a particular machine configured to carry out the described features. The machine 1600 may be configured to operate as a standalone device or may be coupled (for example, networked) to other machines. In a networked deployment, the machine 1600 may operate in the capacity of a server machine or a client machine in a server-client network environment, or as a node in a peer-to-peer or distributed network environment. Machine 1600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1600 is illustrated, the term "machine" include a collection of machines that individually or jointly execute the instructions 1616.

The machine 1600 may include processors 1610, memory 1630, and I/O components 1650, which may be communicatively coupled via, for example, a bus 1602. The bus 1602 may include multiple buses coupling various elements of machine 1600 via various bus technologies and protocols. In an example, the processors 1610 (including, for example, a central processing unit (CPU), a graphics processing unit (GPU), a digital signal processor (DSP), an ASIC, or a suitable combination thereof) may include one or more processors 1612*a* to 1612*n* that may execute the instructions 1616 and process data. In some examples, one or more processors 1610 may execute instructions provided or identified by one or more other processors 1610. The term "processor" includes a multi-core processor including cores that may execute instructions contemporaneously. Although FIG. 16 shows multiple processors, the machine 1600 may include a single processor with a single core, a single processor with multiple cores (for example, a multi-core processor), multiple processors each with a single core, multiple processors each with multiple cores, or any combination thereof. In some examples, the machine 1600 may include multiple processors distributed among multiple machines.

The memory/storage 1630 may include a main memory 1632, a static memory 1634, or other memory, and a storage unit 1636, both accessible to the processors 1610 such as via the bus 1602. The storage unit 1636 and memory 1632, 1634 store instructions 1616 embodying any one or more of the functions described herein. The memory/storage 1630 may also store temporary, intermediate, and/or long-term data for processors 1610. The instructions 1616 may also reside, completely or partially, within the memory 1632, 1634, within the storage unit 1636, within at least one of the processors 1610 (for example, within a command buffer or cache memory), within memory at least one of I/O components 1650, or any suitable combination thereof, during execution thereof. Accordingly, the memory 1632, 1634, the storage unit 1636, memory in processors 1610, and memory in I/O components 1650 are examples of machine-readable media.

As used herein, "machine-readable medium" refers to a device able to temporarily or permanently store instructions and data that cause machine 1600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium"

applies to a single medium, or combination of multiple media, used to store instructions (for example, instructions 1616) for execution by a machine 1600 such that the instructions, when executed by one or more processors 1610 of the machine 1600, cause the machine 1600 to perform and one or more of the features described herein. Accordingly, a "machine-readable medium" may refer to a single storage device, as well as "cloud-based" storage systems or storage networks that include multiple storage apparatus or devices.

The I/O components 1650 may include a wide variety of hardware components adapted to receive input, provide output, produce output, transmit information, exchange information, capture measurements, and so on. The specific I/O components 1650 included in a particular machine will depend on the type and/or function of the machine. For example, mobile devices such as mobile phones may include a touch input device, whereas a headless server or IoT device may not include such a touch input device. The particular examples of I/O components illustrated in FIG. 16 are in no way limiting, and other types of components may be included in machine 1600. The grouping of I/O components 1650 are merely for simplifying this discussion, and the grouping is in no way limiting. In various examples, the I/O components 1650 may include user output components 1652 and user input components 1654. User output components 1652 may include, for example, display components for displaying information (for example, a liquid crystal display (LCD) or a projector), acoustic components (for example, speakers), haptic components (for example, a vibratory motor or force-feedback device), and/or other signal generators. User input components 1654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1650 may include biometric components 1656 and/or position components 1662, among a wide array of other environmental sensor components. The biometric components 1656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1662 may include, for example, location sensors (for example, a Global Position System (GPS) receiver), altitude sensors (for example, an air pressure sensor from which altitude may be derived), and/or orientation sensors (for example, magnetometers).

The I/O components 1650 may include communication components 1664, implementing a wide variety of technologies operable to couple the machine 1600 to network(s) 1670 and/or device(s) 1680 via respective communicative couplings 1672 and 1682. The communication components 1664 may include one or more network interface components or other suitable devices to interface with the network(s) 1670. The communication components 1664 may include, for example, components adapted to provide wired communication, wireless communication, cellular communication, Near Field Communication (NFC), Bluetooth communication, Wi-Fi, and/or communication via other modalities. The device(s) 1680 may include other machines or various peripheral devices (for example, coupled via USB).

In some examples, the communication components 1664 may detect identifiers or include components adapted to detect identifiers. For example, the communication components 1664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1662, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Patent Publication Number 2018/0123815 to Milvaney et al., published May 3, 2018 and titled "Managing Notifications Related to Collaboratively Edited Electronic Documents Based on User Roles," the disclosure of which is herein incorporated by reference in its entirety. Other implementations may make use of the features, systems, components, devices, and methods described in U.S. Patent Publication Number 2017/0177182 to Wong et al., published Jun. 22, 2017, and titled "While You Were Away Experience", U.S. patent application Ser. No. 15/582,598 to Milvaney et al., filed on Apr. 28, 2017, and titled "Managing Changes Since Last Access For Each User For Collaboratively Edited Electronic Documents", and U.S. patent application Ser. No. 15/893,329 to Milvaney et al., filed Feb. 9, 2018 and titled "Selective User Notification of Actions Taken to Content by Other Users" each of these applications being herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for tagging of specific content in electronic content associated with an application, the system comprising:
one or more processors; and
one or more non-transitory computer readable media including instructions which, when executed by the one or more processors, cause the one or more processors to:
automatically analyze an electronic document comprising a plurality of content elements using a machine learning algorithm, wherein each content element includes a portion of the electronic content that is less than an entirety of the electronic document, wherein the machine learning algorithm is configured to receive the electronic document as an input, to analyze the plurality of content elements, and to output a plurality of first workflow stages, and wherein each of the plurality of first workflow stages is associated with a respective content element of the plurality of content elements;
automatically record an association between each of the plurality of first workflow stages with the respective content elements by adding the association to the electronic document;
receive, from a first computing device, first user input responsive to a first user selecting a first content element of a plurality of content elements of an electronic document in the application;
determine, responsive to the first user input, that a first triggering event has occurred for the first content element by detecting a pattern of usage by the first user based on the first user input;
cause, in response to the determination that the first triggering event has occurred, the application to present on a display of the first computing device of the first user, a first user interface element including a plurality of workflow stage options, the plurality of workflow stage options including a first workflow stage;
receive, from the first computing device, a second user input indicating a selection of the first workflow stage;
record, in response to receiving the second user input, an updated association between the first workflow stage and the first content element by automatically updating the association to the electronic document; and
cause the application to display, on a second computing device, a first indicator corresponding to the first workflow stage responsive to the first content element being accessed on the second computing device subsequent to recording the association between the first workflow stage is associated with the first content element.

2. The system of claim 1, wherein:
the instructions further cause the one or more processors to:
reduce access by a second user to the first content element in response to the determination that the first workflow stage is associated with the first content element.

3. The system of claim 1, wherein the instructions further cause the one or more processors to store information associated with a user's credentials.

4. The system of claim 1, wherein the instructions further cause the one or more processors to:
receive a third user input indicating a selection of the first indicator; and
cause, in response to receiving the third user input, the application to invoke a second user interface element presenting at least a first option.

5. The system of claim 4, wherein:
the first option includes a third user interface element presenting an editable copy of the first content element; and
the instructions further cause the one or more processors to:
receive a fourth user input in which the copy of the first content element is modified;

record, in response to receiving the fourth user input, an association between the fourth user input and the first content element; and
display a second indicator corresponding to the fourth user input when the first indicator is being displayed.

6. The system of claim 4, wherein:
the first option includes a third user interface element configured to receive additional information to be associated with the first workflow stage; and
the instructions further cause the one or more processors to:
receive a fourth user input through the third user interface element;
associate, in response to receiving the fourth user input, the fourth user input with the first workflow stage; and
display a second indicator corresponding to the fourth user input when the first indicator is being displayed.

7. The system of claim 4, wherein the instructions further cause the one or more processors to:
receive a fourth user input indicating a selection of the first option, the first option including a second workflow stage that differs from the first workflow stage; and
replace the first workflow stage with the second workflow stage.

8. The system of claim 7, wherein the instructions further cause the one or more processors to:
determine that the second workflow stage is associated with the first content element; and
cause the application to display a second indicator corresponding to the second workflow stage when information regarding the first content element is being accessed in response to the determination that the second workflow stage is associated with the first content element.

9. The system of claim 1, wherein the instructions further cause the one or more processors to:
determine, during use of the application, that a second triggering event has occurred for a second content element, the second content element including a portion of the electronic content;
cause, in response to the determination that the second triggering event has occurred, the application to present the first user interface element including the plurality of workflow stage options, the plurality of workflow stage options including a second workflow stage;
receive a third user input indicating a selection of the second workflow stage;
record, in response to receiving the third user input, an association between the second workflow stage and the second content element;
determine that the second workflow stage is associated with the second content element; and
cause the application to display a second indicator corresponding to the second workflow stage when information regarding the second content element is being accessed in response to the determination that the second workflow stage is associated with the second content element.

10. The system of claim 4, wherein:
the first option includes a second user interface element configured to receive information specifying a limited period of time during which the first indicator will be displayed; and
the instructions further cause the one or more processors to:
receive a fourth user input specifying the period of time;
associate, in response to receiving the fourth user input, the period of time with the first indicator; and
cause the application to display the first indicator when information regarding the first content element is accessed during the specified period of time.

11. A method executed on one or more computing devices to tag specific content in electronic content associated with an application, the method comprising:
automatically analyzing an electronic document comprising a plurality of content elements using a machine learning algorithm, wherein each content element includes a portion of the electronic content that is less than an entirety of the electronic document, wherein the machine learning algorithm is configured to receive the electronic document as an input, to analyze the plurality of content elements, and to output a plurality of first workflow stages, and wherein each of the plurality of first workflow stages is associated with a respective content element of the plurality of content elements;
automatically recording an association between each of the plurality of first workflow stages with the respective content elements by adding the association to the electronic document;
receiving, from a first computing device, first user input responsive to a first user selecting a first content element of a plurality of content elements of an electronic document in the application;
determining, responsive to the first user input, that a first triggering event has occurred for the first content element by detecting a pattern of usage by the first user based on the first user input;
causing, in response to the determination that the first triggering event has occurred, the application to present, on a display of the first computing device of the first user, a first user interface element including a plurality of workflow stage options, the plurality of workflow stage options including a first workflow stage;
receiving, from the first computing device, a second user input indicating a selection of the first workflow stage;
recording, in response to receiving the second user input, an updated association between the first workflow stage and the first content element by automatically updating the association to the electronic document; and
causing the application to display, on a second computing device, a first indicator corresponding to the first workflow stage responsive to the first content element being accessed on the second computing device subsequent to recording the association between the first workflow stage is associated with the first content element.

12. The method of claim 11, wherein:
the method further comprises:
reducing access to a second user to the first content element in response to the determination that the first workflow stage is associated with the first content element.

13. The method of claim 11, further comprising storing information associated with a user's credentials.

14. The method of claim 11, further comprising:
receiving a third user input indicating a selection of the first indicator; and causing, in response to receiving the third user input, the application to invoke a second user interface element presenting at least a first option.

15. The method of claim 14, wherein:
the first option includes a third user interface element presenting an editable copy of the first content element; and
the method further comprises:
receiving a fourth user input in which the copy of the first content element is modified;
recording, in response to receiving the fourth user input, an association between the fourth user input and the first content element; and
displaying a second indicator corresponding to the fourth user input when the first indicator is being displayed.

16. The method of claim 14, wherein:
the first option includes a third user interface element configured to receive additional information to be associated with the first workflow stage; and
the method further comprises:
receiving a fourth user input through the third user interface element;
associating, in response to receiving the fourth user input, the fourth user input with the first workflow stage; and
displaying a second indicator corresponding to the fourth user input when the first indicator is being displayed.

17. The method of claim 14, further comprising:
receiving a fourth user input indicating a selection of the first option, the first option including a second workflow stage that differs from the first workflow stage; and
replacing the first workflow stage with the second workflow stage.

18. The method of claim 17, further comprising:
determining that the second workflow stage is associated with the first content element; and
causing the application to display a second indicator corresponding to the second workflow stage when information regarding the first content element is being accessed in response to the determination that the second workflow stage is associated with the first content element.

19. The method of claim 11, further comprising:
determining, during use of the application, that a second triggering event has occurred for a second content element, the second content element including a portion of the electronic content;
causing, in response to the determination that the second triggering event has occurred, the application to present the first user interface element including the plurality of workflow stage options, the plurality of workflow stage options including a second workflow stage;
receiving a third user input indicating a selection of the second workflow stage;
recording, in response to receiving the third user input, an association between the second workflow stage and the second content element;
determining that the second workflow stage is associated with the second content element; and
causing the application to display a second indicator corresponding to the second workflow stage when information regarding the second content element is being accessed in response to the determination that the second workflow stage is associated with the second content element.

20. The method of claim 14, wherein:
the first option includes a second user interface element configured to receive information specifying a limited a period of time in which the first indicator will be displayed; and
the method further comprises:
receiving a fourth user input specifying the period of time;
in response to receiving the fourth user input, associating the period of time with the first indicator; and
causing the application to display the first indicator when information regarding the first content element is being accessed during the specified period of time.

* * * * *